United States Patent
Yamaga et al.

(10) Patent No.: US 12,361,625 B2
(45) Date of Patent: Jul. 15, 2025

(54) SYSTEM, INFORMATION PROCESSING METHOD, AND COMPUTER PROGRAM FOR DISPLAYING A SPECIFIC GIFT OBJECT AND COMMENT

(71) Applicant: GREE, Inc., Tokyo (JP)

(72) Inventors: Keisuke Yamaga, Tokyo (JP); Yoshiki Kudo, Tokyo (JP)

(73) Assignee: GREE HOLDINGS, Inc., Tokyo (JP)

(*) Notice: Subject to any disclaimer, the term of this patent is extended or adjusted under 35 U.S.C. 154(b) by 223 days.

(21) Appl. No.: 18/148,016

(22) Filed: Dec. 29, 2022

(65) Prior Publication Data
US 2023/0274487 A1    Aug. 31, 2023

(30) Foreign Application Priority Data
Feb. 25, 2022  (JP) ................ 2022-027373

(51) Int. Cl.
*G06T 13/80*  (2011.01)
*G06F 3/0482* (2013.01)
*G06T 11/60*  (2006.01)

(52) U.S. Cl.
CPC ............ *G06T 13/80* (2013.01); *G06F 3/0482* (2013.01); *G06T 11/60* (2013.01)

(58) Field of Classification Search
CPC ........ G06T 13/80; G06T 11/60; G06F 3/0482
See application file for complete search history.

(56) References Cited

U.S. PATENT DOCUMENTS

| 7,386,799 B1* | 6/2008 | Clanton | ................. A63F 13/12 715/861 |
| 2006/0258446 A1* | 11/2006 | Nguyen | .............. G07F 17/3276 463/30 |

(Continued)

FOREIGN PATENT DOCUMENTS

JP    2015184689 A    10/2015

OTHER PUBLICATIONS

Yu, Eun, "Impact of viewer engagement on gift-giving in live video streaming", Telematics and Informatics, 2018, vol. 35, pp. 1450-1460 (Year: 2018).*

(Continued)

*Primary Examiner* — Terrell M Robinson
(74) *Attorney, Agent, or Firm* — Maier & Maier, PLLC

(57) ABSTRACT

A system operable to better facilitate user interaction and avoid frustrating a distribution motivation of a distribution user, a viewing motivation of a viewing user, and/or an interaction motivation between users, which may include a distribution unit displaying a moving image on a viewing user terminal, a reception unit receiving a display request for a predetermined gift and/or a predetermined comment from the viewing user terminal, and a display unit displaying a predetermined gift object and/or the predetermined comment in the moving image, based on the display request received by the reception unit. The display unit may display specific display corresponding to a specific gift and/or a specific comment set in accordance with a manipulation of a distribution user in the moving image, and may display a specific gift object and/or the specific comment in the moving image, in accordance with selection of the specific display by a viewing user.

17 Claims, 17 Drawing Sheets

(56) References Cited

U.S. PATENT DOCUMENTS

| | | | | |
|---|---|---|---|---|
| 2012/0184349 A1* | 7/2012 | Barclay | ............... | G07F 17/3204 |
| | | | | 463/20 |
| 2015/0046847 A1* | 2/2015 | Nims | ................. | A63B 24/0059 |
| | | | | 715/757 |
| 2019/0107990 A1* | 4/2019 | Spivack | ................... | G06T 11/60 |
| 2020/0023280 A1* | 1/2020 | Onda | ....................... | A63F 13/35 |
| 2021/0090402 A1* | 3/2021 | Colvin | ................ | G07F 17/3267 |
| 2024/0257409 A1* | 8/2024 | Yasukawa | ................. | G06T 7/70 |

OTHER PUBLICATIONS

Bredikhina, Liudmila, "Avatar Driven VR Society Trends in Japan," IEEE Conference on Virtual Reality and 3D User Interfaces Abstracts and Workshops (VRW), 2020, pp. 497-503 (Year: 2020).*

* cited by examiner

SYSTEM, INFORMATION PROCESSING METHOD, AND COMPUTER PROGRAM FOR DISPLAYING A SPECIFIC GIFT OBJECT AND COMMENT

FIELD

The present invention relates to an information processing system, an information processing method, and a computer program.

BACKGROUND

An information processing system is known in which the animation of a character object is generated on the basis of the motion of an actor, and a moving image including the animation of the character object is distributed.

SUMMARY

In this technical field, it is important to ensure that distribution users are motivated to perform distribution of a moving image, that viewing users are motivated to view the moving image, and/or that users are motivated to interact with one another. User motivations may be reduced if interaction is too difficult.

Accordingly, an object of the present disclosure is to provide technical improvement for solving or lessening at least a part of the problems of the related art described above. One of the more specific objects of the disclosure is to provide an information processing system, an information processing method, and a computer program that better facilitate user interaction, thereby preventing reduction of a distribution motivation of a distribution user, a viewing motivation of a viewing user, and/or an interaction motivation between users.

An information processing system in the disclosure may be an information processing system including one or a plurality of computer processors, in which the one or the plurality of computer processors include: a distribution unit transmitting information relevant to a moving image including a character object of a distribution user to a viewing user terminal to display the moving image on the viewing user terminal; a reception unit receiving a display request for a predetermined gift and/or a predetermined comment from the viewing user terminal; and a display unit displaying a predetermined gift object corresponding to the predetermined gift and/or the predetermined comment in the moving image, in accordance with the display request received by the reception unit, wherein the display unit displays a specific display corresponding to a specific gift and/or a specific comment set in accordance with a manipulation of the distribution user in the moving image, and displays a specific gift object or the specific comment in the moving image, in accordance with selection of the specific display by a viewing user.

The one or the plurality of computer processors may further include a setting reception unit for setting the specific gift, and the setting reception unit may be capable of setting one or a plurality of gifts selected from a gift list screen by the distribution user as the specific gift.

The reception unit may be capable of receiving the display request for the predetermined gift from the viewing user terminal through the gift list screen, the one or the plurality of computer processors may further include a determination unit determining whether the predetermined gift according to the display request received by the reception unit is the specific gift, and when the determination unit determines that the predetermined gift is the specific gift, the display unit may be capable of displaying the specific gift object in the moving image.

The display unit may be capable of displaying the gift list screen on which the specific gift corresponding to the specific display is displayed to be identifiable from other gifts on the viewing user terminal, in accordance with the selection of the specific display by the viewing user, and the reception unit may be capable of receiving the display request for the specific gift from the viewing user terminal through the gift list screen.

The reception unit may be capable of receiving the display request for the specific gift from the viewing user terminal, in accordance with the selection of the specific display by the viewing user.

The one or the plurality of computer processors may further include a setting reception unit for setting the specific comment, and the setting reception unit may be capable of setting a text designated by the distribution user as the specific comment.

The display unit may be capable of displaying the specific comment corresponding to the specific display in a comment input column, in accordance with the selection of the specific display by the viewing user, and the reception unit may be capable of receiving the display request for the specific comment from the viewing user terminal, in accordance with selection of a transmission button associated with the comment input column.

The reception unit may be capable of receiving the display request for the predetermined comment from the viewing user terminal through a comment input column, the one or the plurality of computer processors may further include a determination unit determining whether the predetermined comment according to the display request received by the reception unit is the specific comment, and when the determination unit determines that the predetermined comment is the specific comment, the display unit may be capable of displaying the specific comment in the moving image.

The display unit may be capable of displaying the specific display only on a specific viewing user terminal, and the specific viewing user terminal can be determined on the basis of an action history of the moving image with respect to a moving image of the viewing user.

The action history can be a history relevant to a viewing time for the moving image by the viewing user and/or the number of display requests for the gift and/or the comment in the moving image by the viewing user.

The one or the plurality of computer processors may further include an effect generation unit generating a specific effect in association with the specific gift object and/or the specific comment when the display unit displays the specific gift object and/or the specific comment in the moving image.

The setting reception unit may be further capable of setting a value of the number of times for receiving the display request for generating a predetermined event, and the one or the plurality of computer processors may further include an event generation unit generating the predetermined event in the moving image when the number of times for receiving the display request reaches the value.

The setting reception unit may be further capable of setting an upper limit value of the number of times for receiving the display request, and the reception unit may not be capable of receiving a subsequent display request when the number of times for receiving the display request reaches the upper limit value.

A ranking based on a point according to the number of display requests for the gift and/or a value of the gift that is subjected to the display request can be set in the viewing user, and the display request for the specific gift can be set to have a point higher than that of the same gift that is not set as the specific gift.

When a character object of another user is included in the moving image, the display unit may be capable of displaying the specific display corresponding to the specific gift and/or the specific comment set in accordance with the manipulation of the distribution user and/or the another user on a screen, and displaying the specific gift object or the specific comment in the moving image, in accordance with the selection of the specific display by the viewing user.

An information processing method in the disclosure may allow one or a plurality of computer processors to execute: a distribution step of transmitting information relevant to a moving image including a character object of a distribution user to a viewing user terminal to display the moving image on the viewing user terminal; a reception step of receiving a display request for a predetermined gift and/or a predetermined comment from the viewing user terminal; and a display step of displaying a predetermined gift object corresponding to the predetermined gift and/or the predetermined comment in the moving image, in accordance with the display request received in the reception step, in which in the display step, a specific display corresponding to a specific gift and/or a specific comment set in accordance with a manipulation of the distribution user is displayed in the moving image, and a specific gift object or the specific comment is displayed in the moving image, in accordance with selection of the specific display by a viewing user.

An information processing method in the disclosure may allow one or a plurality of computer processors to execute: a transmission step of transmitting information relevant to a moving image including a character object of a distribution user and information relevant to a manipulation of the distribution user relevant to setting of a specific gift and/or a specific comment to a server apparatus; a reception step of receiving a display request for the specific gift and/or the specific comment from the server apparatus, in accordance with selection of specific display corresponding to the specific gift and/or the specific comment set in accordance with the manipulation of the distribution user, by a viewing user terminal; and a display step of displaying a specific gift object or the specific comment in the moving image, on the basis of the display request received in the reception step.

A computer program in the disclosure may allow one or a plurality of computer processors to attain: a transmission function of transmitting information relevant to a moving image including a character object of a distribution user and information relevant to a manipulation of the distribution user relevant to setting of a specific gift and/or a specific comment to a server apparatus; a reception function of receiving a display request for the specific gift and/or the specific comment from the server apparatus, in accordance with selection of a specific display corresponding to the specific gift and/or the specific comment set in accordance with the manipulation of the distribution user, by a viewing user terminal; and a display function of displaying a specific gift object or the specific comment in the moving image, on the basis of the display request received by the reception function.

An information processing method in the disclosure may allow one or a plurality of computer processors to execute: a reception step of receiving information relevant to a moving image including a character object of a distribution user and information relevant to a manipulation of the distribution user relevant to setting of a specific gift and/or a specific comment from a server apparatus; a transmission step of transmitting a display request for the specific gift and/or the specific comment to the server apparatus, by selecting specific display corresponding to the specific gift and/or the specific comment set in accordance with the manipulation of the distribution user; and a display step of displaying a specific gift object or the specific comment in the moving image, on the basis of the display request.

A computer program in the disclosure may allow one or a plurality of computer processors to attain: a reception function of receiving information relevant to a moving image including a character object of a distribution user and information relevant to a manipulation of the distribution user relevant to setting of a specific gift and/or a specific comment from a server apparatus; a transmission function of transmitting a display request for the specific gift and/or the specific comment to the server apparatus by selecting a specific display corresponding to the specific gift and/or the specific comment set in accordance with the manipulation of the distribution user; and a display function of displaying a specific gift object or the specific comment in the moving image, on the basis of the display request.

According to the disclosure, it may be possible to provide a technical improvement for solving or lessening at least a part of the problems of the related art described above. Specifically, according to the disclosure, it is possible to provide a system that better facilitates interaction, thereby maintaining the distribution motivation of the distribution user, the viewing motivation of the viewing user, and/or the interaction motivation between the users.

DETAILED DESCRIPTION

First, the outline of an information processing system according to embodiments of the disclosure will be described with reference to the drawings.

The information processing system in the disclosure may be an information processing system including one or more information processing apparatuses and a server apparatus, and may include one or a plurality of computer processors.

A moving image that may be displayed on each apparatus may be described as a moving image including the animation of a character object that is generated on the basis of the motion of a distribution user, but is not limited thereto, and may be a moving image including the animation of the character object that is generated in accordance with the manipulation of the distribution user, or may be a moving image including the own image of the distribution user. In addition, the moving image may be a moving image including only the voice of the distribution user without displaying the character object or the distribution user.

In addition, a space that is displayed in the moving image may be a virtual space, may be a reality space, or may be an augmented reality space in which the virtual space and the reality space are integrated. In addition, the moving image may be at least a karaoke moving image in which a predetermined video and the voice of the distribution user are played back, or a live game moving image, or may be a moving image in which the actual image of the character object or the distribution user is displayed to be superimposed on the karaoke moving image or the live game moving image.

In addition, in a case where the distribution user is included in the reality space, the character object that is generated on the basis of the motion of the distribution user may be displayed to be superimposed on the actual image of the distribution user. In addition, animation such as a gift object may be displayed to be superimposed on an image obtained by capturing the reality space.

<System Configuration>

Figure 1:
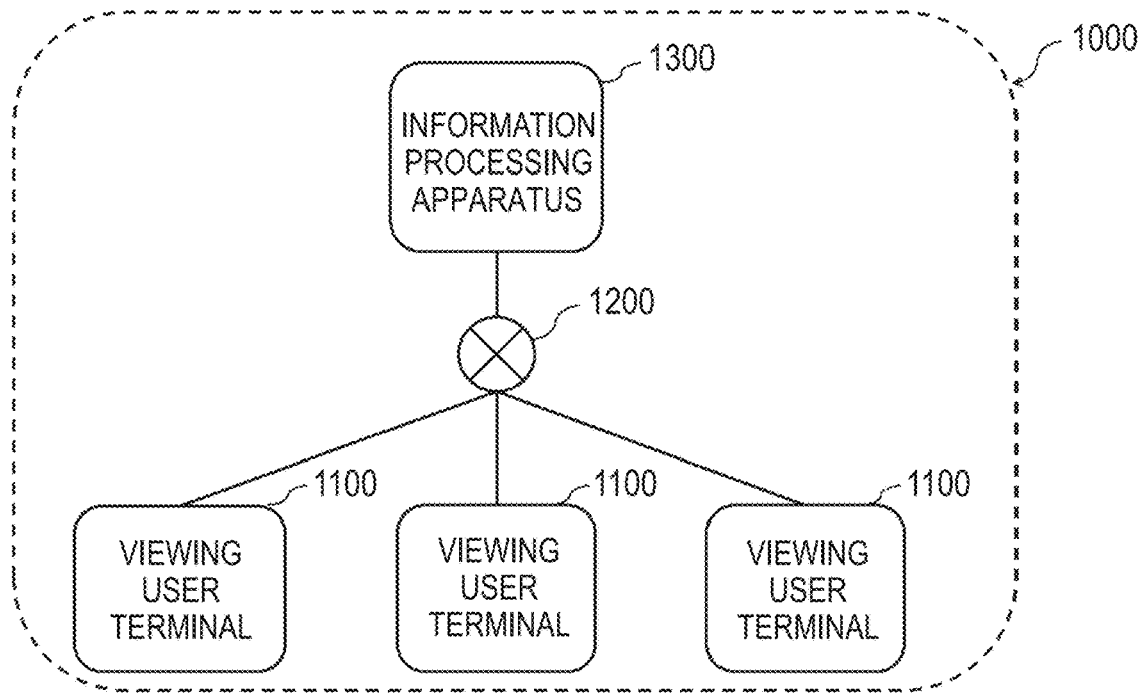
FIG. 1 is a system configuration diagram illustrating an example of an information processing system in the disclosure.

As illustrated in FIG. 1 as an example, an information processing system 1000 according to the disclosure may include one or more viewing user terminals 1100, and an information processing apparatus (a support computer) 1300 that is connected to the viewing user terminal 1100 through a network 1200 and is arranged in a moving image distribution studio, or the like.

In addition, the information processing apparatus 1300 may be connected to a predetermined server apparatus through the internet, and a part or all of the processing to be performed by the information processing apparatus 1300 may be performed by the server apparatus. Note that such a server apparatus may be an information processing apparatus 2400 illustrated in FIG. 2.

Herein, the distribution of such an information processing system 1000 may be referred to as studio distribution.

In the studio distribution, the whole-body motion of the distribution user (an actor) is reflected on a character in real time by capturing markers attached to the distribution user with a camera provided in the studio using the existing motion capture technology.

Figure 2:
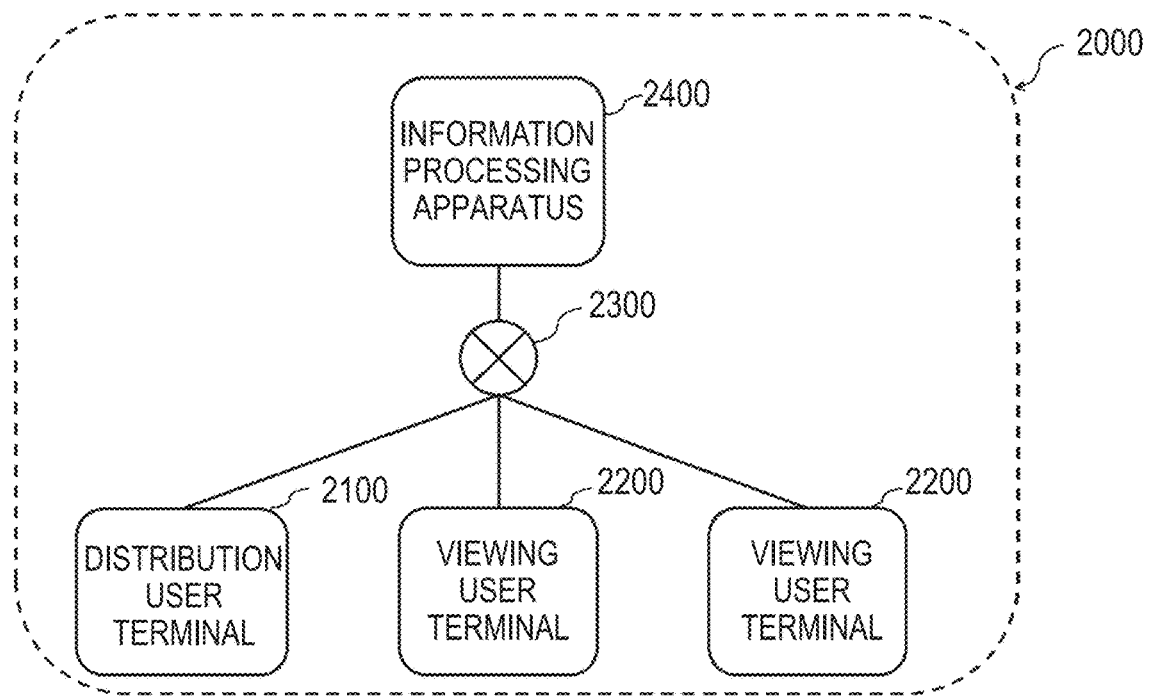
FIG. 2 is a system configuration diagram illustrating an example of the information processing system in the disclosure.

In addition, the information processing system 1000 according to an exemplary embodiment is capable of cooperating with another information processing system 2000 illustrated in FIG. 2, as an example. The information processing system 2000 illustrated in FIG. 2 may include a distribution user terminal 2100, one or more viewing user terminal s 2200, and an information processing apparatus (a server apparatus) 2400 that is connected to the distribution user terminal 2100 and the viewing user terminal 2200 through a network 2300.

In the example described above, the distribution user terminal 2100 can be an information processing terminal such as a smart phone. Herein, the distribution of such an information processing system 2000 will be referred to as a mobile distribution.

In the mobile distribution, a face motion of the distribution user may be reflected on the face of the character in real time by capturing the face of the distribution user with a camera provided in the distribution user terminal 2100 using the existing face tracking technology.

Note that the distribution user and a viewing user in the mobile distribution may not be particularly distinguished, such that the viewing user may be capable of performing the mobile distribution at any time, and the distribution user can be the viewing user in the case of viewing moving images of other distribution users.

The moving image that is generated by the information processing system 1000 and the information processing system 2000 can be distributed to the viewing user from one moving image distribution platform, as an example.

In addition, in any distribution, processing of generating the animation by reflecting the motion on the character, processing of displaying a gift described below, or the like may be performed by being shared in the distribution user terminal, the viewing user terminal, the information processing apparatus, and other apparatuses.

That is, here, the "distribution" indicates the transmission of information for enabling the viewing of the moving image on the terminal of the viewing user, and the rendering of the moving image may be performed on the information processing apparatuses 1300 and 2400 side, or may be performed on the distribution user terminal 2100 side and the viewing user terminals 1100 and 2200 side.

Specifically, face motion data and voice data of the distribution user may be transmitted to a terminal or an apparatus generating (rendering) the animation of the character object from the distribution user terminal or the information processing apparatus. In addition, a body motion may be transmitted, in addition to the face motion.

In the disclosure, the processing of generating the animation will be described as processing that may be performed by each of the distribution user terminal and the viewing user terminal, but is not limited thereto.

Figure 3:
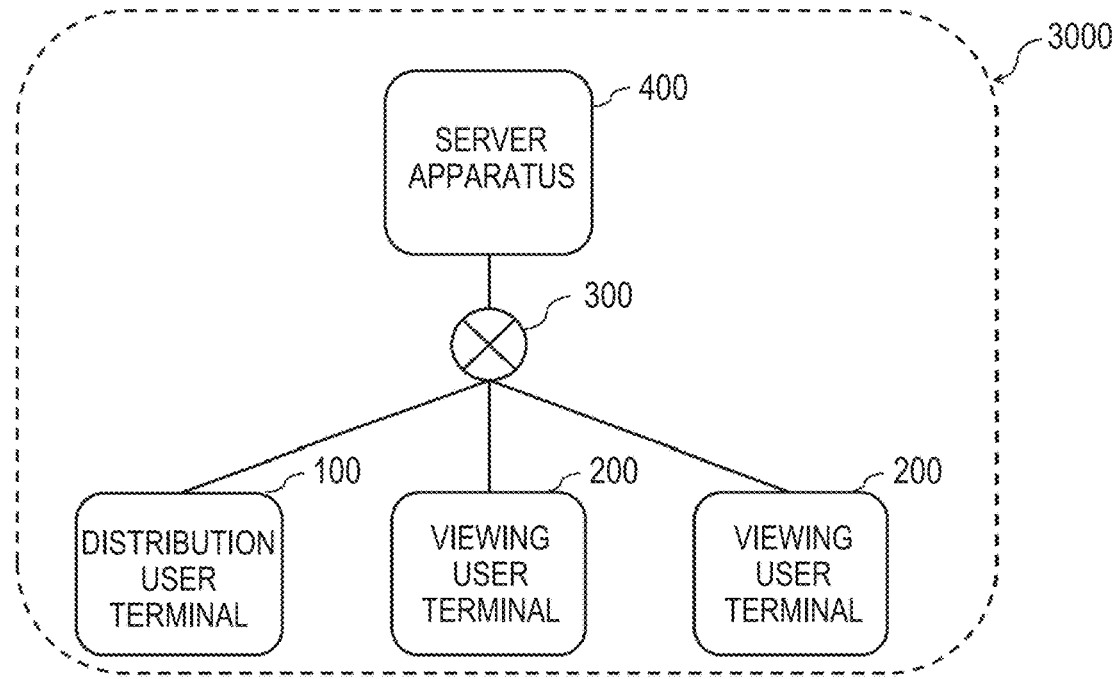
FIG. 3 is a system configuration diagram illustrating an example of the information processing system in the disclosure.

Then, the information processing system in the disclosure can also be applied to any of the examples illustrated in FIG. 1 and FIG. 2. Therefore, as illustrated in FIG. 3, an information processing system 3000 in the embodiments of the disclosure may be described as an information processing system including a distribution user terminal 100, a viewing user terminal 200, and a server apparatus 400 that can be connected to the distribution user terminal 100 and the viewing user terminal 200 through a network 300.

The distribution user terminal 100 may function at least as the information processing apparatus 1300 or the distribution user terminal 2100 described above, the viewing user terminal 200 may function at least as one or more viewing user terminals 1100 and 2200 described above, and the server apparatus 400 may function at least as the predetermined server apparatus or the information processing apparatus 2400 described above.

In the disclosure, the distribution user terminal 100 and the viewing user terminal 200 can be a smart phone (a multifunctional telephone terminal), a tablet terminal, a personal computer, a game console, a wearable computer such as a head-mounted display (HMD) and a spectacles-type wearable terminal (such as AR glass), and an information processing apparatus that is capable of playing back the moving image, other than the apparatuses described above. In addition, such terminals may be a stand-alone apparatus that is operated alone, or may include a plurality of apparatuses that are connected to each other such that various data pieces can be transmitted and received.

<Hardware Configuration>

Figure 4:
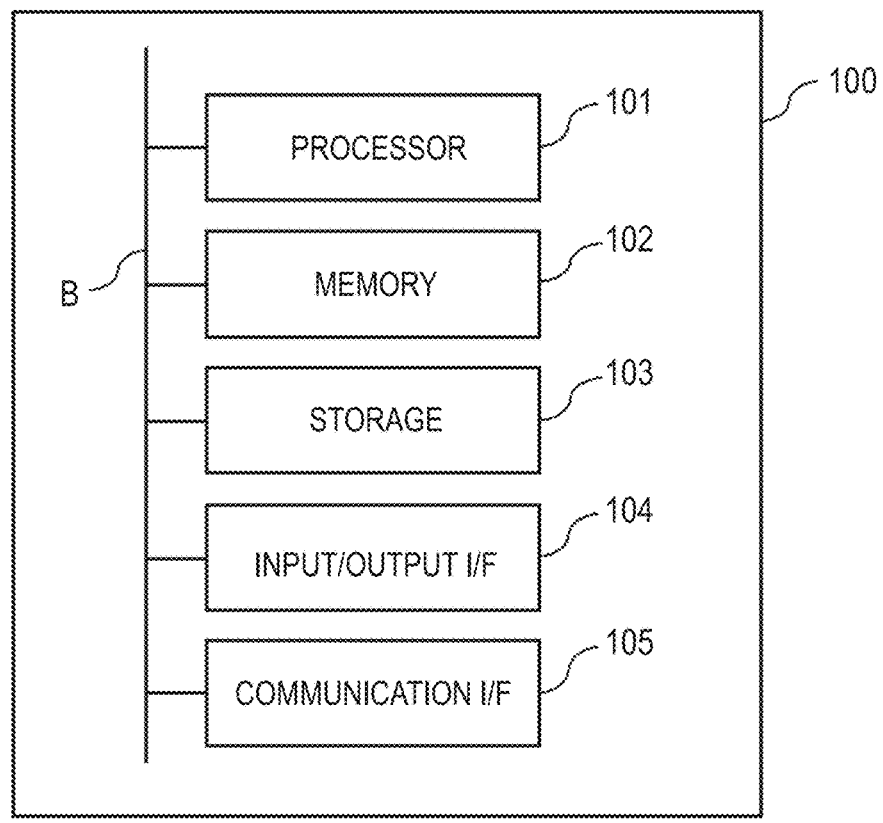
FIG. 4 is a configuration diagram illustrating an example of a hardware configuration of a server apparatus, a distribution user terminal, and a viewing user terminal in the disclosure.

Here, a hardware configuration of the distribution user terminal 100 may be described by using FIG. 4. The distribution user terminal 100 may include a processor 101, a memory 102, a storage 103, an input/output interface (an input/output I/F) 104, and a communication interface (a communication I/F) 105. The constituents may be connected to each other through a bus B.

The distribution user terminal 100 may be capable of attaining functions and methods described in this embodiment, in cooperation with the processor 101, the memory 102, the storage 103, the input/output I/F 104, and the communication I/F 105.

The processor 101 may execute a function and/or a method attained by a code or a command included in a program that is stored in the storage 103. The processor 101, for example, may include a central processing device (CPU), a micro processing unit (MPU), a graphics processing unit (GPU), a microprocessor, a processor core, a multiprocessor, an application-specific integrated circuit (ASIC), a field programmable gate array (FPGA), and the like, and each processing disclosed in each embodiment may be attained by a logic circuit (hardware) formed in an integrated circuit (IC) chip, large scale integration (LSI), or the like or a dedicated circuit. In addition, such circuits may be attained by one or a plurality of integrated circuits, and a plurality of processings described in each embodiment may be attained by one integrated circuit. In addition, LSI may be referred to as VLSI, super LSI, ultra LSI, and the like, in accordance with a difference in an integration degree.

The memory 102 transitorily stores a program that is loaded from the storage 103, and provides a workspace to the processor 101. The memory 102 also transitorily stores various data pieces that may be generated while the processor 101 may execute the program. The memory 102, for example, may include a random access memory (RAM), a read only memory (ROM), and the like.

The storage 103 may store a program. The storage 103, for example, may include a hard disk drive (HDD), a solid state drive (SSD), a flash memory, and the like.

The communication I/F 105 may be mounted as hardware such as a network adapter, communication software, and a combination thereof, and transmits and receives various data pieces through the network 300. The communication may be executed in a wired or wireless manner, and any communication protocol may be used insofar as the communication can be executed to each other. The communication I/F 105 may execute communication with respect to other information processing apparatuses through the network 300. The communication I/F 105 may transmit various data pieces to other information processing apparatuses, in accordance with an instruction from the processor 101. In addition, the communication I/F 105 may receive various data pieces transmitted from other information processing apparatuses, and may transmit the data to the processor 101.

The input/output I/F 104 may include an input device inputting various manipulations with respect to the distribution user terminal 100, and an output device outputting a processing result obtained by the processing of the distribution user terminal 100. In the input/output I/F 104, the input device and the output device may be integrated, or the input device and the output device may be separated.

The input device may be or may include any of all types of devices capable of receiving input from a user and transmitting information according to the input to the processor 101, or a combination thereof. The input device, for example, may include a touch panel, a touch display, a hardware key such as a keyboard, a pointing device such as a mouse, a camera (manipulation input through an image), and a microphone (manipulation input using a voice).

The input device may include a sensor unit. The sensor unit may be one or more sensors detecting a face motion indicating a change in the neutral expression of the user and a body motion indicating a change in a relative position of the body of the user with respect to the sensor unit. The face motion may include a motion such as blinking or opening and closing of the mouth. As the sensor unit, a known product can be used. An example of the sensor unit may include a ToF sensor measuring and detecting time of flight until light applied toward the user is reflected on the face or the like of the user and returned, a camera capturing the face of the user, and an image processing unit performing image processing with respect to data captured by the camera. In addition, the sensor unit may include an RGB camera imaging a visible light ray, and a near-infrared camera imaging a near-infrared ray. As the RGB camera or the near-infrared camera, for example, True Depth of the IPHONEX, LiDAR of the IPAD PRO, and other ToF sensors mounted on smart phones can be used. Specifically, such cameras project tens of thousands of invisible dots (points) to the face of the user by a dot projector. Then, reflected light of a dot pattern may be detected and analyzed, a depth map of the face may be formed, and an infrared image of the face or the like may be captured, and thus, accurate face data may be captured. An arithmetic processing unit of the sensor unit may generate various information pieces, on the basis of the depth map and the infrared image, may compare the information with registered reference data, and may calculate the depth of each of the points on the face (a distance between each of the points and the near-infrared camera) and a positional shift other than the depth.

In addition, the sensor unit may have a function of tracking not only the face of the user but also the hand (hand tracking). The sensor unit may further include sensors such as an acceleration sensor or a gyroscope sensor, other than the sensors described above. The sensor unit may have a space mapping function of recognizing an object in the reality space where the user exists, on the basis of a detection result of the ToF sensor described above or other known sensors, and mapping the recognized object on a space map. Hereinafter, in a case where detection data of the face motion and detection data of the body motion may not be particularly distinguished, the detection data may be simply referred to as "tracking data". Note that, the image processing unit of the sensor unit may include a control unit that can be provided in the information processing system according to an exemplary embodiment.

As a manipulation unit as the input device, a manipulation unit according to the type of user terminal can be used. An example of the manipulation unit is a touch panel integrated with a display, a manipulation button provided in the housing or the like of the user terminal, a keyboard, a mouse, a controller that is manipulated by the user with the hand, and the like. Various known sensors such as an inertial measurement sensor (an inertial measurement unit: IMU) including an acceleration sensor and a gyroscope sensor may be built in the controller. In addition, another example of the manipulation unit may be a tracking device specifying the motion of the hand of the user, the motion of the eyes, the motion of the head, the direction of the visual line, and the like. In such an aspect, for example, an instruction of the user may be determined, the distribution of the moving image may be started or ended, or various manipulations such as a message, the evaluation on the moving image, and a display request for a predetermined object (for example, a gift described below) can be executed, on the basis of the motion of the hand of the user. Note that, in a case where the sensor unit also has an input interface function such as the hand tracking function, the manipulation unit can be omitted.

The output device may output the processing result obtained by the processing of the processor 101. The output device, for example, may include a touch panel, a speaker, and the like.

In addition, the viewing user terminal 200 and the server apparatus 400 in the disclosure may have the same hardware configuration as that illustrated in FIG. 4, unless otherwise noted.

Subsequently, various functions that can be executed in the user terminal in which an application attained by the information processing system in the embodiments of the disclosure is started, and the transition of a screen to be displayed may be described with reference to the drawings.

Figure 5:
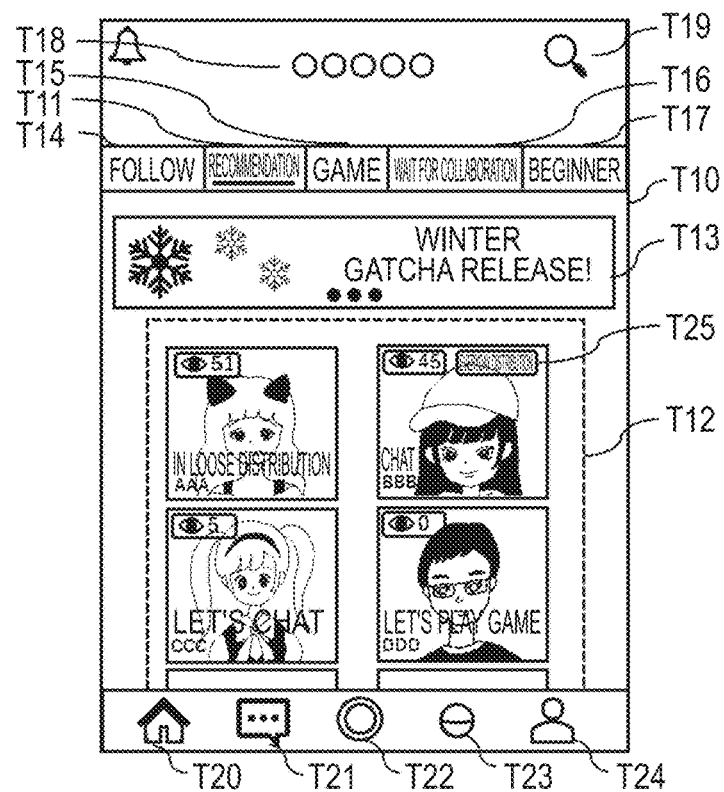
FIG. 5 is a conceptual diagram illustrating an exemplary image of a screen that is displayed on a user terminal.

FIG. 5 illustrates a top screen T10 that is displayed on the user terminal when starting a distribution/viewing application of the moving image (here, whether the user performs viewing/distribution is not yet specified).

As illustrated in FIG. 5, the user may select one distribution channel (referred to as a distribution frame, a distribution program, a distribution moving image, or the like) from thumbnail images of one or more recommended distribution channels T12 that may be displayed as a list in a recommendation tab T11 on the top screen T10, and thus, is capable of viewing a moving image that is played back by the distribution channel.

Alternatively, the user may access a fixed link of one specific distribution channel, and thus, is capable of viewing a moving image that is played back by the one specific distribution channel. Such a fixed link can be obtained by a notice from the distribution user whom the user is following, a share notification sent from other users, or the like.

As described above, the user viewing the moving image is the viewing user, and the terminal viewing the moving image is the viewing user terminal 200.

In addition, as illustrated in FIG. 5, a display column T13 for a notice such as a campaign or an event is displayed on the top screen T10. The display column T13 for a notice can be switched to the display of another notice by a slide manipulation.

Then, from the top screen T10, a follow tab T14, a game tab T15 for displaying a game category, a collaboration waiting tab T16 for displaying a distribution channel waiting for a collaboration, and a beginner tab T17 for displaying a distribution channel of a beginner may be displayed. By selecting such a tab (by switching the tab), the top screen T10 is transitioned to another screen.

Note that a service name display T18 and a search button T19 in the upper frame of the top screen T10 may be fixedly displayed on a transition destination screen.

Similarly, a home button T20, a message button T21, a distribution preparation button T22, a gatcha button T23, and a profile button T24 in the lower frame of the top screen T10 may be fixedly displayed on the transition destination screen.

On the top screen T10 and the like illustrated in FIG. 5, the user selecting the thumbnail image T12 to be displayed may be the viewing user viewing the moving image as described above, and the user selecting the distribution preparation button T22 may be the distribution user distributing the moving image.

Figure 6:
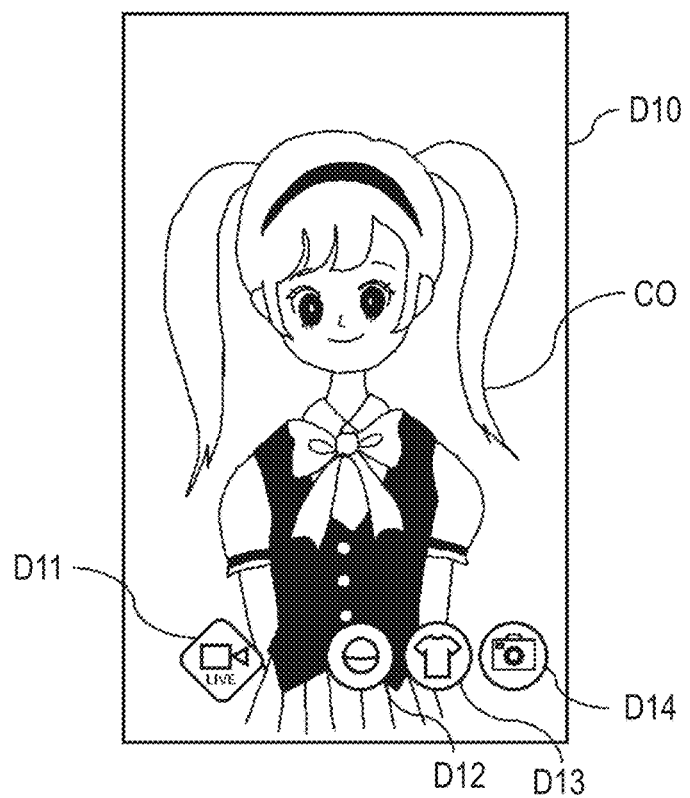
FIG. 6 is a conceptual diagram illustrating an exemplary image of the screen that is displayed on the user terminal.

As an example, in a case where the distribution preparation button T22 is selected on the top screen T10 illustrated in FIG. 5, the screen may be transitioned to an avatar setting screen D10 illustrated in FIG. 6. Then, in a case where a distribution button D11 is selected on the avatar setting screen D10, the screen may be transitioned to a distribution setting screen D20 illustrated in FIG. 7. Then, in a case where a distribution start button D25 is selected on the distribution setting screen D20, the screen may be transitioned to an avatar distribution screen D30 illustrated in FIG. 8.

Subsequently, the details of a flow until the distribution of the moving image is started may be described.

One or a plurality of computer processors in the disclosure may include a distribution start request reception unit, a distribution setting unit, and a distribution start unit.

The distribution start request reception unit may receive a distribution start request for a first moving image including the animation of the character object from the distribution user terminal of the distribution user.

Here, the first moving image may indicate the moving image including the animation of the character object. Note that, herein, the character object may be referred to as an "avatar".

Then, the distribution start request described above can be transmitted to the information processing apparatus 400 from the user terminal by selecting the distribution button D11 arranged on the avatar setting screen D10 or the like transitioned from the top screen described above that is displayed on the user terminal (to be the distribution user terminal later) in which a dedicated application (the distribution/viewing application of the moving image) for accessing the moving image distribution platform is started.

FIG. 6 illustrates an example of the avatar setting screen D10. On the avatar setting screen D10, a character object CO, a distribution button D11, a gatcha button D12, a clothing change button D13, a photo button D14, and the like can be displayed.

In a case where the clothing change button D13 is selected by the user, a closet screen for selecting various avatar parts such as the eyes, the nose, the mouth, the hair, the accessory, the clothes, and the background of the character object CO may be laid out.

In a case where the gatcha button D12 is selected by the user, a drawing screen for acquiring the avatar parts described above may be laid out.

In a case where the photo button D14 is selected by the user, a capture screen for capturing a still image of the character object may be laid out.

Then, in a case where the distribution button D11 is selected by the user, the distribution start request may be transmitted to the information processing apparatus 400.

The distribution setting unit may set distribution setting of the first moving image, on the basis of the designation from the distribution user terminal 100, in accordance with the distribution start request for the first moving image that is received by the distribution start request reception unit.

Figure 7:
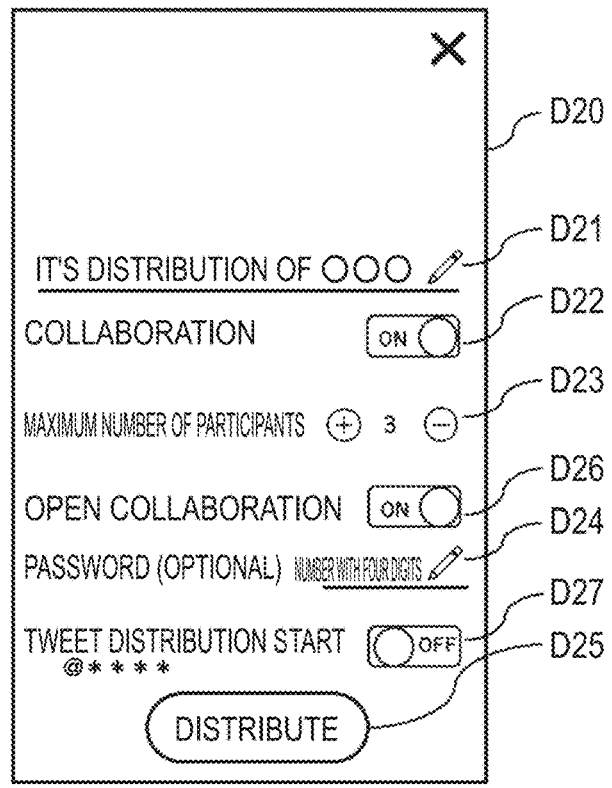
FIG. 7 is a conceptual diagram illustrating an exemplary image of the screen that is displayed on the user terminal.

As an example, in a case where the distribution button D11 is selected, the screen to be displayed on the distribution user terminal 100 may be transitioned to the distribution setting screen D20 illustrated in FIG. 7 from the avatar setting screen D10 illustrated in FIG. 6.

In the distribution setting, at least one of setting relevant to the title of the first moving image, setting relevant to appearance availability of other users in the first moving image, setting relevant to the number of people who can appear in the first moving image, and setting relevant to a password can be included.

Such distribution setting can be performed in each of a title setting column D21, a collaboration availability setting column D22, a number of people setting column D23, and a password setting column D24 in FIG. 7. Note that, in FIG. 7, an open collaboration availability setting column D26 and an SNS posting availability column D27 may be displayed.

The title of the first moving image can be freely determined by the distribution user within the range of the number of letters up to an allowable upper limit. Note that, in a case where there is no input from the distribution user, a title set in advance, including the name of the character object (the distribution user) such as "It's distribution of ○○○♪", may be automatically determined.

The appearance availability of the other user in the first moving image can be freely determined by the distribution user. In a case where the appearance is available, the other user is capable of asking the distribution user for the appearance, and in a case where appearance is not available, the other user is not capable of asking the distribution user for the appearance. Herein, a state where the other user appears in the moving image of the distribution user may be referred to as a "collaboration". The details of the collaboration may be described below.

The number of people who can appear in the first moving image can be set only in a case where the appearance of the other user in the first moving image is available, and can be freely determined by the distribution user in the range of the number of people up to the allowable upper limit.

The password can be arbitrarily set only in a case where the appearance of the other user in the first moving image is available, and a number with the designated number of digits can be freely determined by the distribution user. When the other user asks for the appearance in the first moving image, the input of the password is requested. Note that, only in a case where the open collaboration availability setting column D26 is OFF, the password setting column D24 may be active.

The distribution start unit may distribute information relevant to the first moving image to the viewing user terminal 200 of the viewing user, on the basis of a condition set by the distribution setting unit.

Such a distribution start instruction is transmitted by the selection of the distribution start button D25 illustrated in FIG. 7.

As an example, the distribution start unit may distribute the information relevant to the moving image (the first moving image) including the animation of the character object of the distribution user to the viewing user terminal 200 of the viewing user (performs avatar distribution).

The information relevant to the first moving image, for example, may include motion information indicating the motion of the character object, voice information of the distribution user, gift object information indicating a gift sent from other viewing users, and the like. Then, the gift object information may include at least gift object identification information for specifying the type of gift object, and position information indicating a position in which the gift object is displayed.

Then, the distribution start unit may be capable of distributing the moving image live through the moving image distribution platform.

Figure 8:
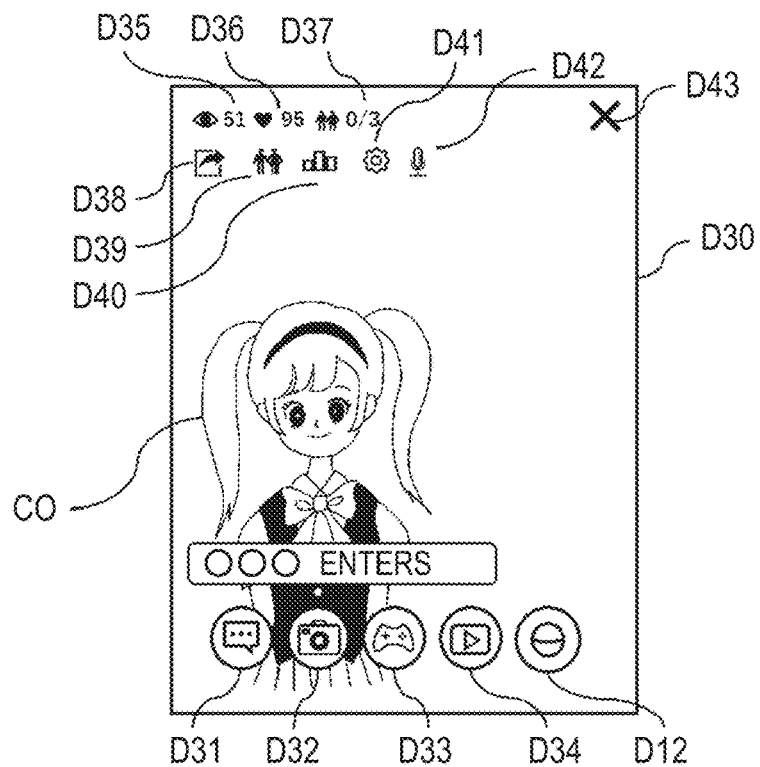
FIG. 8 is a conceptual diagram illustrating an exemplary image of the screen that is displayed on the user terminal.

FIG. 8 illustrates the avatar distribution screen D30 that may be displayed on the distribution user terminal 100.

On the avatar distribution screen D30, the character object CO may be displayed, and a comment input button D31 for the distribution user to input a comment, a photo button D32 for storing a still image of the screen, a play start button D33 for playing a game described below, an external service linkage button D34 for viewing a moving image that is provided by an external service, and the gatcha button D12 for acquiring the avatar parts can be displayed.

In addition, in the upper portion of the avatar distribution screen D30, cumulative number of viewers display D35, cumulative number of likes display D36, number of collaboration people display D37, a share button D38 for an external SNS, a guest details button D39, a ranking display button D40, a setting button D41, and a voice switch button D42 for switching ON/OFF of the voice can be displayed. In addition, an end button D43 for ending the distribution is also displayed.

The detailed description of the displays and the buttons is omitted, but the distribution setting set on the distribution setting screen D20 can be changed by the selection of the setting button D41.

Note that FIG. 8 illustrates an example in which the distribution may be started by setting the appearance of the other user in the first moving image to be available and the number of people who can appear in the first moving image to 3, and thus, the character object CO may be displayed on the lower left side, on the distribution setting screen D20. In the empty space, up to three character objects of the other users can appear.

The screen transition when performing the avatar distribution according to an exemplary embodiment in the disclosure has been described.

Subsequently, screen transition when the distribution user plays a game during the distribution may be described.

One or a plurality of computer processors in the disclosure may include a game request reception unit, a game moving image distribution unit, and a game display processing unit.

The distribution user may be capable of performing a play start request for a game by selecting the play start button D33 in the middle of the avatar distribution as illustrated in FIG. 8.

Note that, the game that may be displayed by the selection of the play start button D33 may be a dedicated game implemented on the application that is attained by the information processing system in the disclosure, and can be different from a versatile game that is provided by the external service. Accordingly, game distribution in the disclosure may be distinguished from the distribution of a play moving image of the versatile game provided by the external service that is performed together with the actual state of the distribution user.

Alternatively, the play start request can be transmitted to the information processing apparatus 400 from the distribution user terminal 100 by selecting a play start button arranged on a predetermined screen that is displayed on the distribution user terminal 100 of the distribution user.

Figure 9:
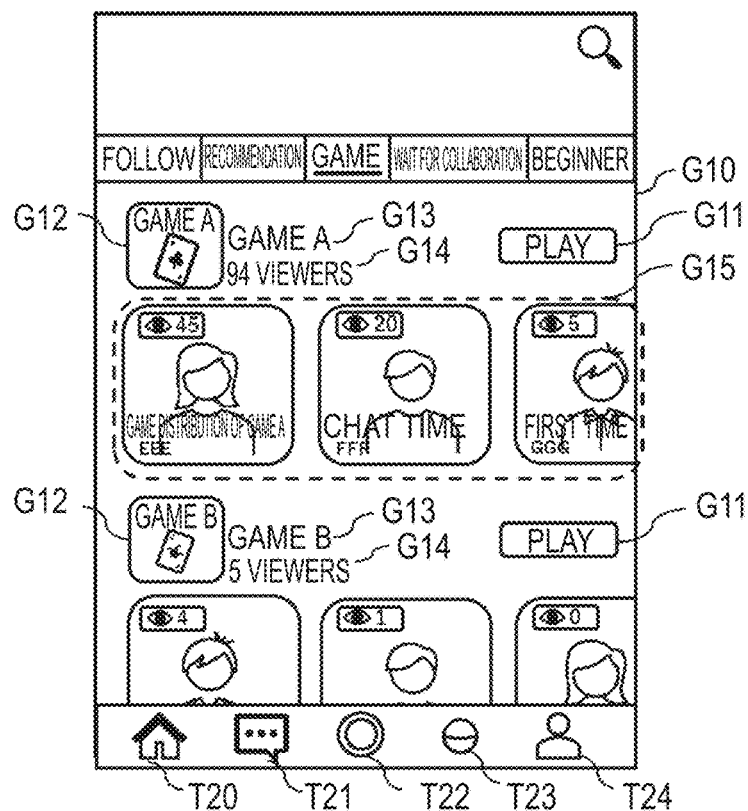
FIG. 9 is a conceptual diagram illustrating an exemplary image of the screen that is displayed on the user terminal.

FIG. 9 illustrates an example of a screen G10 on which a play start button G11 may be arranged, as the predetermined screen described above. The screen G10 illustrated in FIG. 9 is a screen that is transitioned by the selection of the game tab T15 from the top screen T10 (FIG. 5) displayed on the user terminal in which the application attained by the information processing system in the disclosure may be started.

On the screen G10, at least the play start button G11 that is capable of transmitting a play start request for a predetermined game is displayed.

Then, in a case where the game request reception unit receives the play start request for the predetermined game, the game moving image distribution unit may distribute information relevant to a second moving image to the viewing user terminal 200.

Here, the second moving image is a play moving image of the predetermined game. Herein, distribution in which such a moving image is displayed on the screen of the viewing user terminal 200 may be referred to as "game distribution".

In addition, after the application attained by an exemplary embodiment in the disclosure is started, the user may select a play start object arranged on a game list screen and a game details screen, and thus, may be capable of transmitting a distribution start request for the second moving image to the information processing apparatus 2400, as the distribution user.

The game list screen or the game details screen is a first screen described below.

That is, the game display processing unit may perform display processing of the first screen including a distribution start object that is capable of transmitting the distribution start request, the play start object that is capable of transmitting the play start request for the predetermined game, and a thumbnail image of the moving image during the distribution of the play moving image of the predetermined game.

The screen G10 illustrated in FIG. 9 corresponds to the game list screen in the first screen. The first screen that is the game list screen is a screen that is transitioned by the selection of the game tab T15 from the top screen T10.

Such a first screen may include the distribution preparation button T22 as the distribution start object, the play start button G11 as the play start object, and the thumbnail image indicating the distribution channel of the moving image.

On the first screen, the play start button G11, a game icon G12, a game name G13, the total number G14 of viewers of the distribution channel of the game, and a distribution list G15 including the thumbnail image of the distribution channel during the game distribution may be respectively displayed, for each of a plurality of games that can be played.

Note that, here, a display order of the thumbnail image that is displayed in the distribution list G15 to be displayed can be changed by the viewing user. As an example, the thumbnail image may be arranged in priority order such as in descending order of the number of follows of the viewing users and the number of views of the viewing users, in descending order of the cumulative number of viewers, and in chronological order from the start of the distribution. Note that a display range of the thumbnail image of the distribution list G15 can be changed by horizontal scroll.

In addition, as the game displayed on the game list screen, top 10 titles with the following priority may be read. As an example, the priority may be set in reverse chronological order within 48 hours from a game distribution start date and within 30 days from a play date of the viewing user, in descending order of the priority of a period ID, and in descending order of the period ID.

The distribution list G15 may be updated in the case of returning from the screen of the other tab and when performing an update manipulation (pull-to-refresh).

Figure 10:
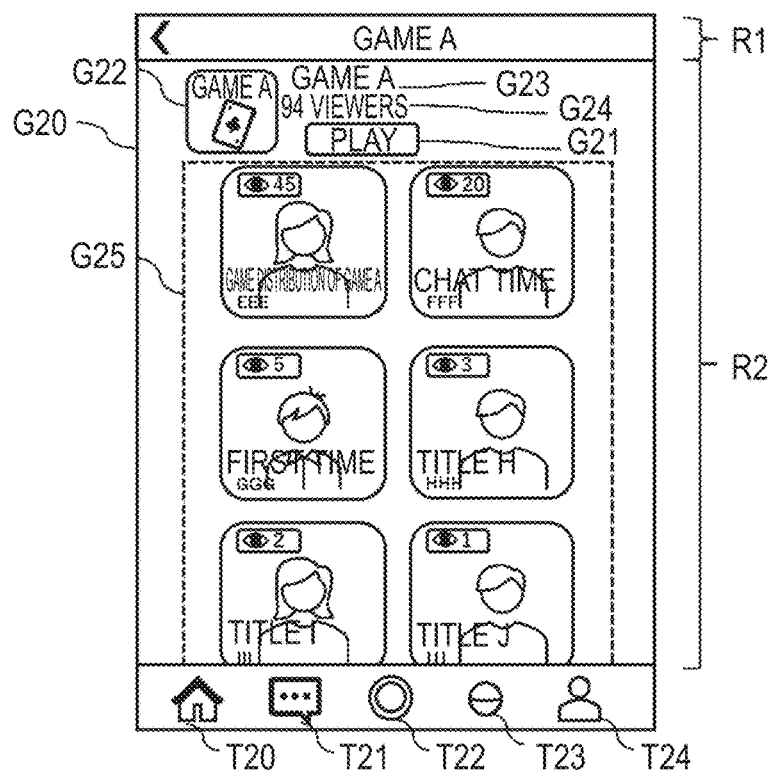
FIG. 10 is a conceptual diagram illustrating an exemplary image of the screen that is displayed on the user terminal.

Then, FIG. 10 corresponds to an exemplary embodiment of a game details screen in the first screen. The first screen that is the game details screen is a screen G20 that is transitioned by selecting the game icon G12 or the game name G13 displayed on the game list screen illustrated in FIG. 9.

Such a first screen may include the distribution preparation button T22 as the distribution start object, the play start button G21 as the play start object, and the thumbnail image indicating the distribution channel of the moving image.

In addition, on the first screen, a game icon G22, a game name G23, the total number G24 of viewers of the distribution channel of the game, and a distribution list G25 including the thumbnail image of the distribution channel during the game distribution may be respectively displayed.

Note that, here, a display order of the thumbnail image that is displayed in the distribution list G25 to be displayed can be changed by the viewing user. As an example, the thumbnail image may be arranged in priority order such as in descending order of the number of follows of the viewing users and the number of views of the viewing users, in descending order of the cumulative number of viewers, and in chronological order from the start of the distribution. Note that a display range of the thumbnail image of the distribution list G25 can be changed by vertical scroll.

The distribution list G25 may be updated in the case of returning from the screen of the other tab and when performing an update manipulation (pull-to-refresh).

As described above, the user who selects the distribution start object (the distribution preparation button T22) or the play start object (the play start buttons G11 and G24) may be the distribution user performing the distribution start request or the play start request.

In addition, the user who selects the thumbnail image may be the viewing user viewing the second moving image.

In addition, the first screen may include a first region in which a scroll manipulation is not available, and a second region in which the scroll manipulation is available.

Here, the first screen is the first screen illustrated in FIG. 10. Then, the first screen may include a first region R1 and a second region R2. Specifically, in the first region R1, the game title is displayed, and in the second region R2, the play start button G21, the game icon G22, the game name G23, the number G24 of viewers, and the distribution list G25 may be displayed.

Then, the first region R1 may be a portion in which the scroll manipulation is not available and is fixedly displayed on the display screen, and the second region R2 may be a portion in which the scroll manipulation is available by the user. By scrolling the second region R2, the user may be capable of checking the thumbnail image hidden outside the screen.

However, it may be desired to avoid having the play start button G21 be hidden outside the screen by scrolling the second region, and thus, the display processing unit in the disclosure may be capable of displaying the play start object (the play start button G21) in the first region R1, in accordance with a display state of the play start object (the play start button G21) displayed in the second region R2.

Figure 11:
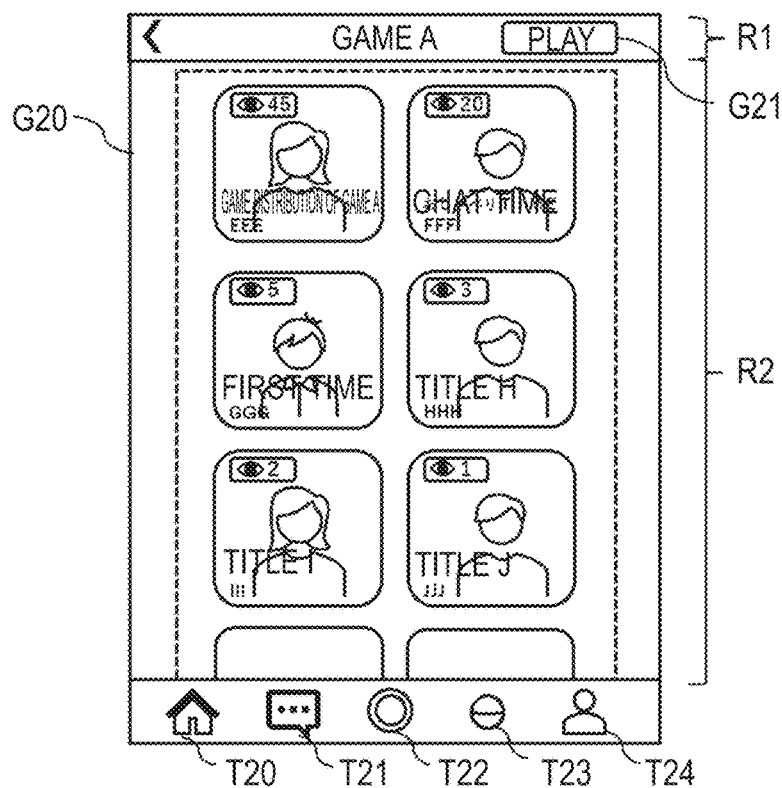
FIG. 11 is a conceptual diagram illustrating an exemplary image of the screen that is displayed on the user terminal.

As an example, in FIG. 10, the play start button G21 may be displayed in the second region R2, but in FIG. 11, the play start button may be displayed in the first region R1. That is, in a case where a part or all of the play start button G21 is not displayed in the second region R2, the play start button G21 may appear in the first region.

In addition, the game display processing unit may gradually display the play start object in the first region R1, in accordance with the display state of the play start object displayed in the second region R2.

Such expression can be attained by changing the transparency of the play start object, in accordance with a scroll amount of the second region R2.

As an example, the scroll amount (unit is pixels) of 0 to 50 may correspond to a button transparency of 0.0 (completely transparent) to 1.0 (completely opaque). Then, in the initial display state, the object may be completely transparent, and thus, is not seen, and the object is completely displayed in the case of scrolling by 50 pixels or more. In an exemplary embodiment, the transparency of the object may be linearly changed in (0 to 50). Note that, the unit of the scroll amount may be logic pixels, which may be different from the actual pixels of the display.

In addition, the game request reception unit may be capable of receiving a play end request for the predetermined game from the distribution user terminal 100 after the information relevant to the second moving image is distributed by the game moving image distribution unit.

The play end request can be transmitted by the selection of the end button arranged on the game screen.

Then, in a case where the game request reception unit receives the play end request for the predetermined game, the distribution start unit may be capable of ending the distribution of the information relevant to the second moving image, and distributing the information relevant to the first moving image.

That is, here, not a part of the information of the first moving image but the entire information of the first moving image may be distributed.

Then, in a case where the distribution start unit ends the distribution of the information relevant to the second moving image, and distributes the information relevant to the first moving image, the first moving image may be displayed on the viewing user terminal 200.

Subsequently, a flow of starting the viewing of the moving image may be described.

One or a plurality of processors in the disclosure may further include a viewing reception unit.

The viewing reception unit may receive a viewing request for the moving image from the user.

The distribution start unit may distribute information relevant to a video and a voice as moving image information to the information processing terminal of the user, in accordance with the viewing request.

Figure 12:
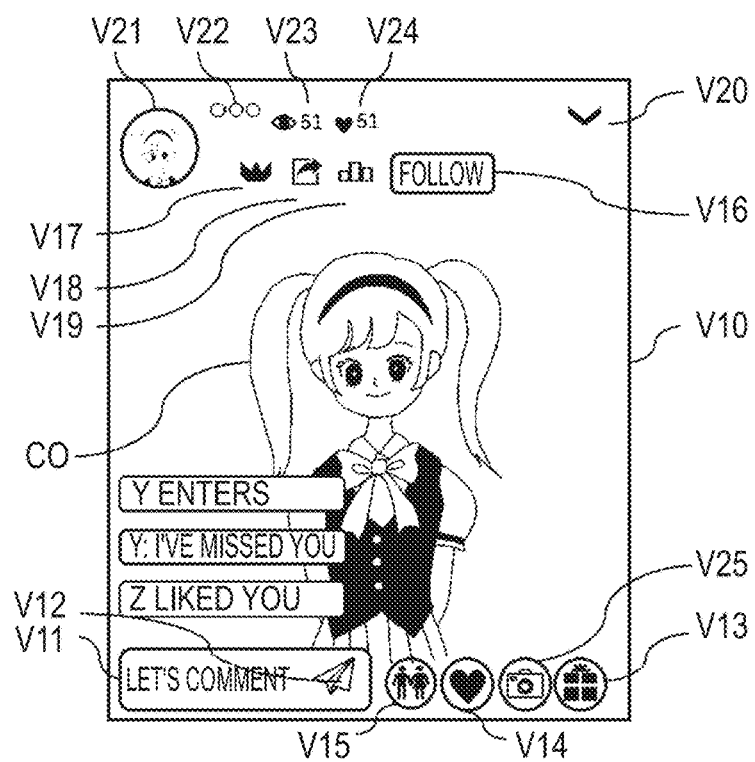
FIG. 12 is a conceptual diagram illustrating an exemplary image of the screen that is displayed on the user terminal.

FIG. 12 is an example of a viewing screen V10 of an avatar moving image that may be displayed on the viewing user terminal 200.

The viewing user may input a text to a comment input column V11, and may press a transmission button V12, and thus, may be capable of posting a comment.

In addition, by pressing a gift button V13, a gift list (a screen V30 in FIG. 13) can be displayed to the viewing user, and a display request for a gift designated by selection can be transmitted.

In this case, one or a plurality of processors in the disclosure may include a determination unit. The determination unit determines whether there is the display request for the gift from the viewing user terminal 200.

In the display request, the gift object information can be included. The gift object information may include at least the gift object identification information for specifying the type of gift object, and the position information indicating the position in which the gift object may be displayed.

Figure 13:
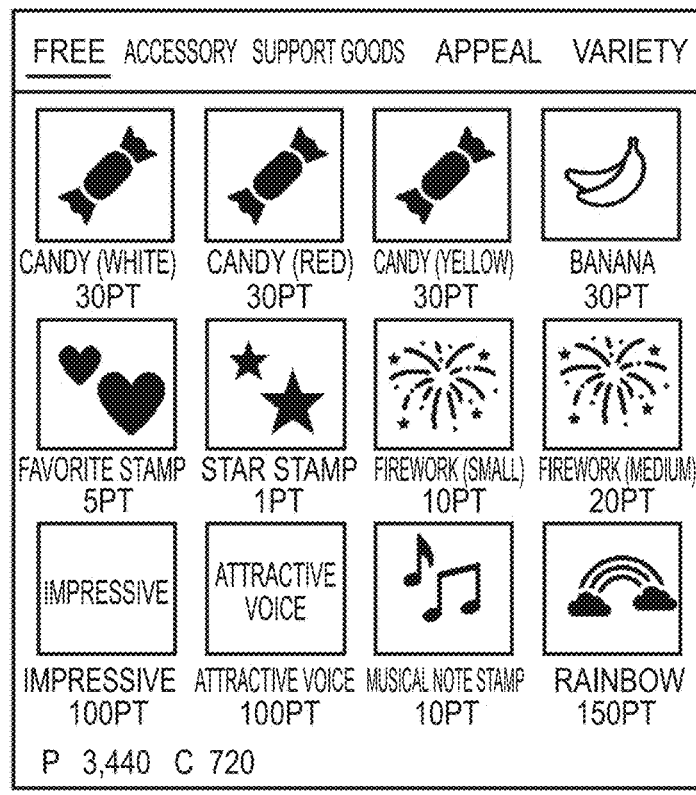
FIG. 13 is a conceptual diagram illustrating an exemplary image of the screen that is displayed on the user terminal.

In addition, as illustrated in FIG. 13, the gift can be displayed separately for each classification (such as a free (paid) gift, an accessory, support goods, appeal, and variety).

Here, the paid gift is a gift (a coin gift) that can be purchased by consuming coins purchased by the viewing user, and the free gift may be a gift (a point gift) that is available with or without consuming points that may be acquired by the viewing user without any charge.

Note that, the term "gift" used in the present application may indicate the same concept as that of a "token". Therefore, the term "gift" can also be replaced with the term "token" to understand the technology described in the application.

In addition, by pressing a like button V14, the viewing user may be capable of posting evaluation indicating favoredness. Note that, buttons for posting negative evaluation or other feelings can also be displayed in addition to/instead of the like button V14.

In addition, in a case where the distribution user may set the appearance of the other user to be available in the distribution setting, the appearance in the moving image can be asked by selecting a collaboration ask button V15.

In addition, a follow button V16 for the viewing user to follow the distribution user is displayed on the screen of the moving image distributed by the distribution user who is not yet followed by the viewing user. The follow button may function as a follow cancel button on the screen of the moving image distributed by the distribution user who is already followed by the viewing user.

Note that, the viewing user may "follow" the viewing user, the distribution user may "follow" the viewing user, and the distribution user may "follow" the distribution user. Here, the follow is managed as association only in one direction, and association in a reverse direction is separately managed as a follower.

In addition, a photo button V25 for storing the still image of the screen can also be displayed.

In addition, on the viewing screen V10, a support ranking display button V17, a share button V18, and a ranking display button V19 may also be displayed.

The support ranking displays the ranking of the viewing users supporting the distribution user, and the ranking can be calculated in accordance with the value (for example, in points or in coins) of the gift, or the like.

In addition, regarding the sharing of the moving image, by pressing the share button V18, the viewing user may be capable of checking a sharable social network service (SNS) list and transmitting a fixed link to a designated location of the SNS designated by selection.

In addition, by pressing the collaboration ask button V15, it is possible to request collaboration distribution from the distribution user. The collaboration distribution may indicate that the character object of the viewing user may appear in the distribution moving image of the distribution user.

In the upper portion of the viewing screen V10, a distribution user icon V21, a distribution user name (a character object name) V22, cumulative number of viewers display V23, and cumulative number of likes display V24 can be displayed.

In addition, in a case where the viewing end button V20 is selected, a screen for ending the viewing may be laid out, and a viewing end request can be transmitted.

Such a screen for ending the viewing may be described in detail. Such a screen is referred to as "small-window voice distribution", and imay be for performing viewing in a state where only the voice is played back in the display of the video of the moving image.

The selection of the viewing end button V20 may be received by the viewing reception unit as the viewing end request for the moving image.

In this case, the distribution start unit may end the distribution of the information relevant to the video, in accordance with the viewing end request, but may not end the distribution of the information relevant to the voice.

Then, in the user terminal, in a case where the information relevant to the video and the voice is distributed, the video may be displayed on a main screen of the user terminal, and in a case where only the information relevant to the voice is distributed, the video may not be displayed but a sub-screen indicating that the moving image is being viewed may be displayed on the user terminal.

Figure 14:
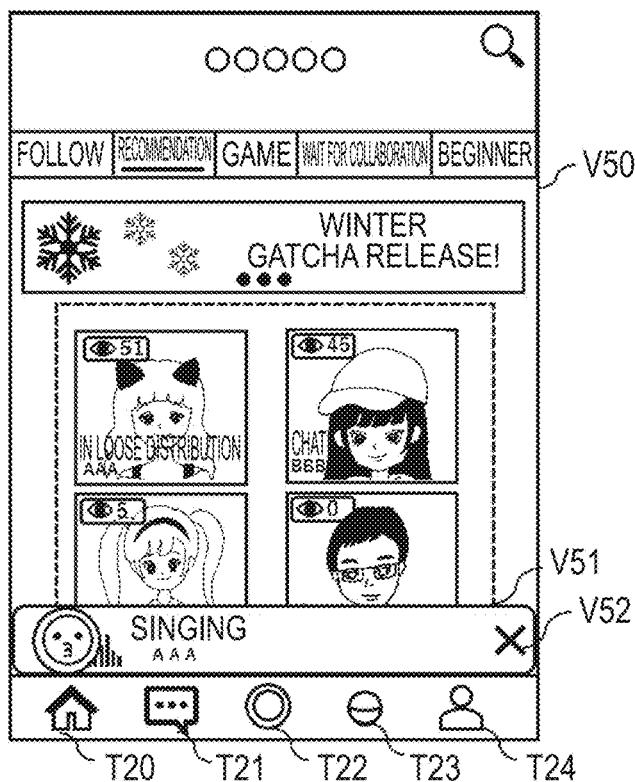
FIG. 14 is a conceptual diagram illustrating an exemplary image of the screen that is displayed on the user terminal.

FIG. 14 illustrates an image of a screen V50 on which a sub-screen V51 described above may be displayed.

When such a sub-screen V51 is displayed, the main screen displayed at the back may be transitioned to the screen before viewing the moving image. For example, in the case of moving from the recommendation tab to the viewing frame, the main screen returns to the display of the recommendation tab, and in the case of moving from the follow tab to the viewing frame, the main screen may be transitioned to the follow tab.

In a case where the sub-screen V51 is displayed, a manipulation on the main screen is available, and transition to other screens may be available.

On the sub-screen V51, a profile image, a name, a title, and a voice icon in which the flow of the voice is visually identifiable may be displayed.

Then, the viewing can be completely ended by the selection of an end icon V52 displayed on the sub-screen V51.

Note that the end of the display of the video may be that the information is transmitted from the server apparatus, but is not displayed on the terminal side, or may be that the transmission itself of the information is stopped from the server apparatus.

According to such a configuration, it is possible to search for other distributions or enjoy chatting with other users while listening only to the voice.

Subsequently, the "collaboration" in which the other user may appear in the moving image of the distribution user may be described.

As described above, the viewing user may be capable of transmitting a participation request for the moving image described above through a check screen of a collaboration distribution participation request that is displayed by pressing the collaboration ask button V15 illustrated in FIG. 12.

A collaboration avatar display unit provided in one or a plurality of computer processors in the disclosure may display the character object generated on the basis of the motion of the viewing user who has made the participation request in the moving image, in accordance with the received participation request.

Figure 15:
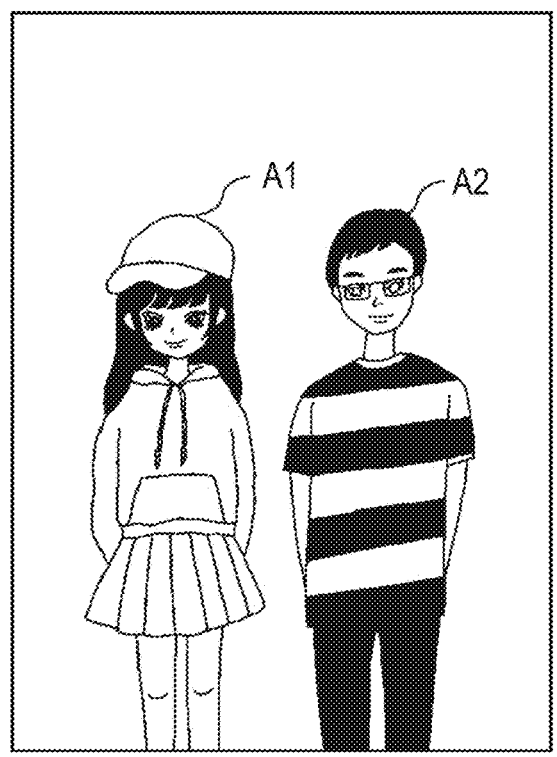
FIG. 15 is a conceptual diagram illustrating an exemplary image of the screen that is displayed on the user terminal.

As an example, FIG. 15 illustrates a viewing screen or a distribution screen in a case where a second avatar A2 that is a character object of a guest user participates in a moving image in which a first avatar A1 that is a character object of a host user is displayed. Note that, in FIG. 15, the display of objects other than the avatars is omitted.

Figure 16:
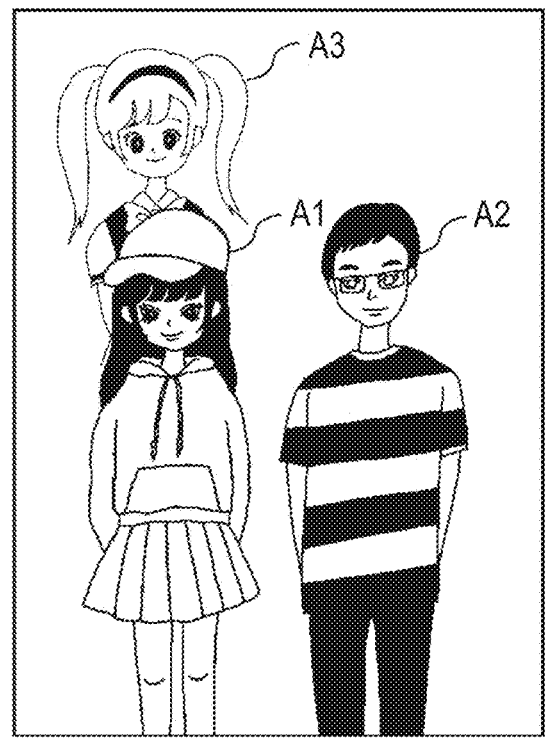
FIG. 16 is a conceptual diagram illustrating an exemplary image of the screen that is displayed on the user terminal.

In addition, as illustrated in FIG. 16, a third avatar A3 that is a character object generated on the basis of the motion of another viewing user may further participate in the moving image. Note that, in FIG. 16, the third avatar A3 may be arranged behind the first avatar A1 and the second avatar A2, but three people may be arranged side by side. In addition, an arrangement position of the avatar can be designated by the distribution user.

Figure 17:
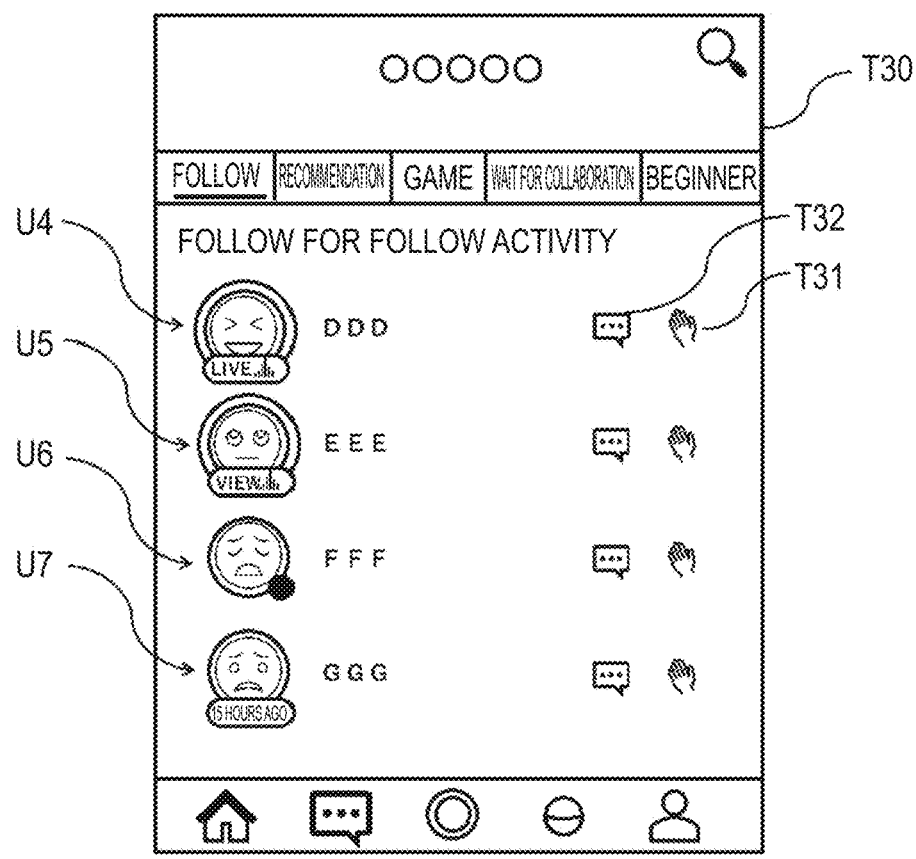
FIG. 17 is a conceptual diagram illustrating an exemplary image of the screen that is displayed on the user terminal.

FIG. 17 illustrates a list screen T30 of the users having a mutual follower relationship, which is displayed by the selection of the follow tab on the top screen illustrated in FIG. 5. The mutual follower status may indicate a relationship in which the users may be followers of each other.

On the list screen T30, profile images and names of the users having the mutual follow relationship may be displayed.

As illustrated in FIG. 17, on the list screen T30, the first object T31 may be displayed for each of the users having the mutual follower relationship. In addition, a chat object T32 may be displayed together with the first object T31. By selecting such a chat object, it is possible to transition to an individual chat screen with a second user.

The first object T31 may transmit a predetermined notification to the terminal of the user associated with the first object T31.

As an example, the predetermined notification can be a calling notification.

First Embodiment

Subsequently, various functions executable in the distribution user terminal 100, the viewing user terminal 200, and/or the server apparatus 400, which may be provided in the information processing system 3000 according to a first embodiment in the disclosure, may be described with reference to the drawings.

Figure 18:
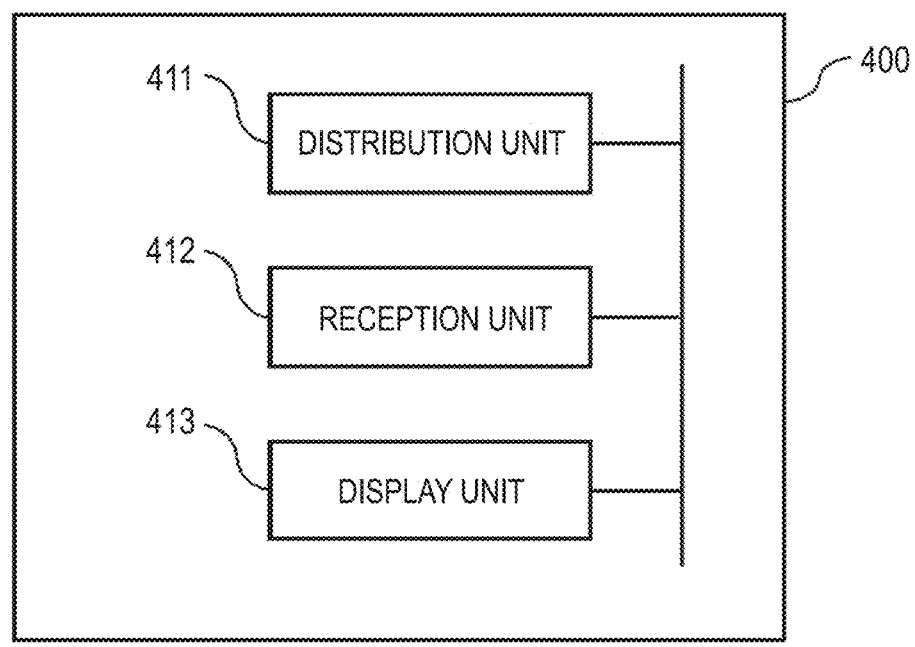
FIG. 18 is a configuration diagram illustrating an example of a function configuration of a server apparatus in a first embodiment in the disclosure.

As illustrated in FIG. 18, one or a plurality of computer processors provided in the information processing system 3000 according to the embodiments of the disclosure include a distribution unit 411, a reception unit 412, and a display unit 413.

The distribution unit 411 may transmit the information relevant to the moving image including the character object of the distribution user to the viewing user terminal 200 to display the moving image on the viewing user terminal 200.

Such a distribution unit 411 may function as the distribution start unit described above. The details may be as described above.

The reception unit 412 may receive a display request for a predetermined gift and/or a predetermined comment from the viewing user terminal 200.

As described above, by the viewing user pressing the gift button V13 on the viewing screen V10 as illustrated in FIG. 12, the gift list (the screen V30 in FIG. 13) can be displayed to the viewing user, and the display request for the gift designated by the selection can be transmitted. The display request for the gift may include at least identification information for specifying the type of gift.

In addition, the viewing user may input a text to the comment input column V11 on the viewing screen V10 as illustrated in FIG. 12, and may be capable of transmitting a display request for a comment by pressing the transmission button V12. The display request for the comment may include at least text information.

The display unit 413 may display a predetermined gift object corresponding to the predetermined gift and/or the predetermined comment in the moving image, in accordance with the display request received by the reception unit 412.

Figure 19:
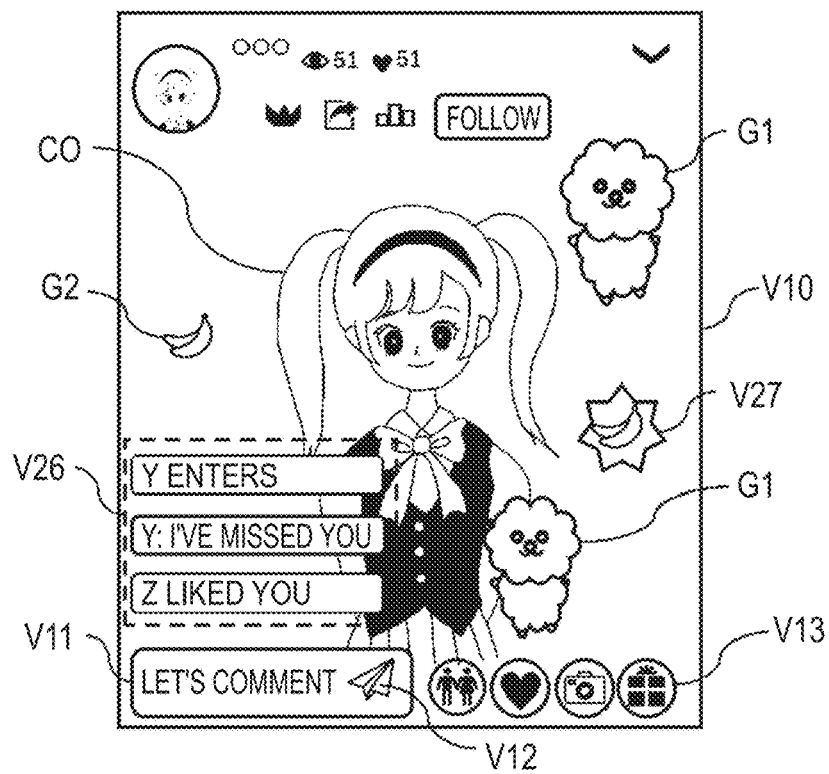
FIG. 19 is a conceptual diagram illustrating an exemplary image of a screen that is displayed on a user terminal.

As an example, as illustrated in FIG. 19, a comment corresponding to the comment subjected to the display request may be displayed in a comment display column V26. The latest comment may be displayed on the bottom and may be moved up by one step in a case where the next comment is displayed, and the display may be ended after the comment is moved to the top of the comment display column V26. Note that FIG. 19 is the viewing screen V10 displayed on the viewing user terminal 200, as with FIG. 12, in which some of the same reference numerals as those in FIG. 12 are omitted.

In addition, as an example, as illustrated in FIG. 19, a gift object G1 corresponding to the gift subjected to the display request may be displayed to fall from the upper portion of the moving image and may be stopped at a stop position (such as a floor), and then, the display may be ended after a lapse of a given length of time.

Then, the display unit 413 may display specific display corresponding to a specific gift and/or a specific comment set in accordance with the manipulation of the distribution user in the moving image.

The distribution user may be capable of setting the specific gift and/or the specific comment before the distribution of the moving image and/or during the distribution of the moving image.

Figure 20:
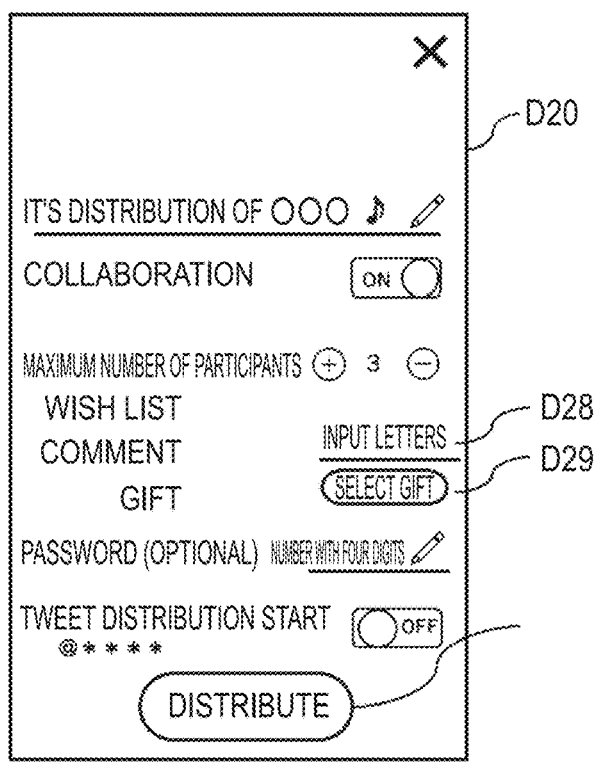
FIG. 20 is a conceptual diagram illustrating an exemplary image of the screen that is displayed on the user terminal.

FIG. 20 provides an exemplary a screen for setting the specific gift and/or the specific comment. Note that FIG. 20 is the distribution setting screen D20 displayed on the distribution user terminal 100 as with FIG. 7, in which some of the same reference numerals as those in FIG. 7 are omitted. That is, such setting can be performed on the distribution setting screen D20.

In FIG. 20, a "wish list" may be displayed as an item for setting the specific gift and/or the specific comment. Then, a comment setting column D28 for setting the specific comment and a gift setting column D29 for setting the specific gift may be displayed.

According to an exemplary embodiment, the specific gift and/or the specific comment set in the wish list may be a gift and/or a comment desired to be sent while the moving image may be distributed to the viewing user from the distribution user.

By inputting a predetermined text to the comment setting column D28, the distribution user may be capable of designating and setting the text as the specific comment.

Similarly, the distribution user may be capable of selecting one or a plurality of gifts from a gift list screen (FIG. 21) that is laid out by selecting the gift setting column D29 and setting the gift as the specific gift. Specifically, information indicating that the gift is set as the specific gift may be associated with the gift object identification information of the selected gift, and may be stored in a predetermined storage unit.

Figure 21:
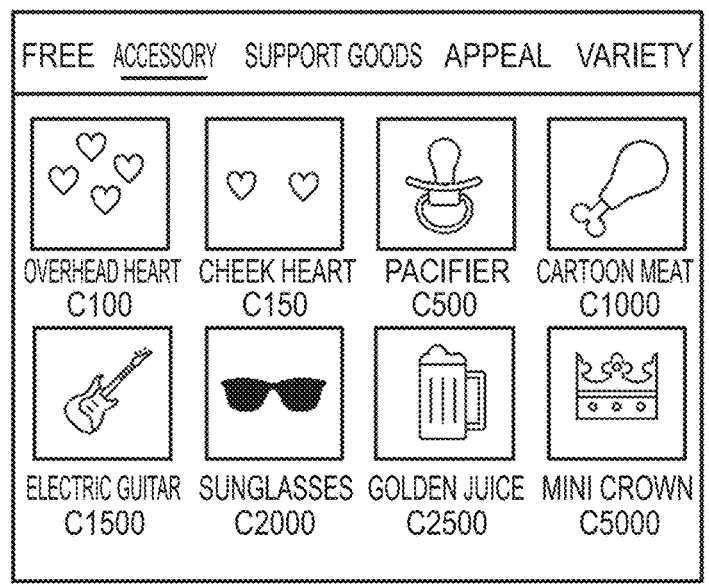
FIG. 21 is a conceptual diagram illustrating an exemplary image of the screen that is displayed on the user terminal.

Note that FIG. 21 is an example in which a tab for a gift (an accessory tab) that requires the consumption of a paid coin may be selected, and here, the gift to be selected may be a paid gift (a coin gift), or may be a free gift (a point gift).

Then, as illustrated in FIG. 19, specific display V27 corresponding to the specific gift and/or the specific comment set by the distribution user may be displayed in the moving image (the viewing screen V10).

As an example, the specific display V27 can be an icon indicating the contents of the specific gift and/or the specific comment, but is not limited thereto, and may be an icon indicating that the specific gift and/or the specific comment are set.

In FIG. 19, an example is illustrated in which an icon in a case where a banana gift is set as the specific gift is displayed as the specific display V27.

Then, the display unit 413 may display a specific gift object and/or the specific comment in the moving image, in accordance with the selection of the specific display V27 by the viewing user.

In FIG. 19, an example is illustrated in which a specific gift object G2 (a banana object) is displayed in accordance with the selection of the specific display V27 in a case where the banana gift is set.

According to the configuration described above, it is possible to provide technical improvement for solving or lessening at least a part of the problems of the related art described above. Specifically, according to the disclosure, it is possible to provide a system that better facilitates user interaction, and consequently better avoids frustrating a distribution motivation of the distribution user, a viewing motivation of the viewing user, and/or an interaction motivation between the users.

In general, the viewing user may be capable of freely selecting the gift to be subjected to the display request (to be sent) in the distributed moving image. The distribution user may have a desired gift, such as a case where a ranking is set for each sent gift in the moving image or a case where the distribution user sets the theme of the moving image.

In such a case, in the related art, there is no other method but the distribution user may request the desired gift by a talk, a comment, or the like during the distribution.

Similarly, in general, the viewing user may be capable of freely inputting the comment to be subjected to the display request (to be posted) in the distributed moving image. The distribution user may have a comment desired to be posted, such as a case where the distribution user may set a comment desired to be posted in the moving image (such as a catchphrase of the distribution user or a set expression at the beginning of the distribution).

In such a case, in the related art, there is no other method but the distribution user may request the desired comment by a talk, a comment, or the like during the distribution.

However, according to the configuration of the disclosure described above, the distribution user may be capable of setting the gift (and/or the comment) desired to be sent from the viewing user in the moving image.

Accordingly, the distribution user is highly likely to receive the desired gift, and the simplification of this interaction is therefore likely to help improve the distribution user's distribution motivation. In addition, an interaction such as saying thank you to the viewing user who has sent the gift is facilitated.

In addition, the viewing user may be capable of sending the desired gift of the distribution user, and thus, may easily appeal to the distribution user, and an interaction such as hearing a word of thanks from the distribution user may occur. Accordingly, the viewing motivation of the viewing user is also improved.

In addition, the request during the distribution may be missed/passed in accordance with a timing when the viewing user enters, but by constantly displaying the specific display on the screen, the viewing user advantageously may be capable of checking the desired gift/the desired comment of the distribution user at any time.

Figure 22:
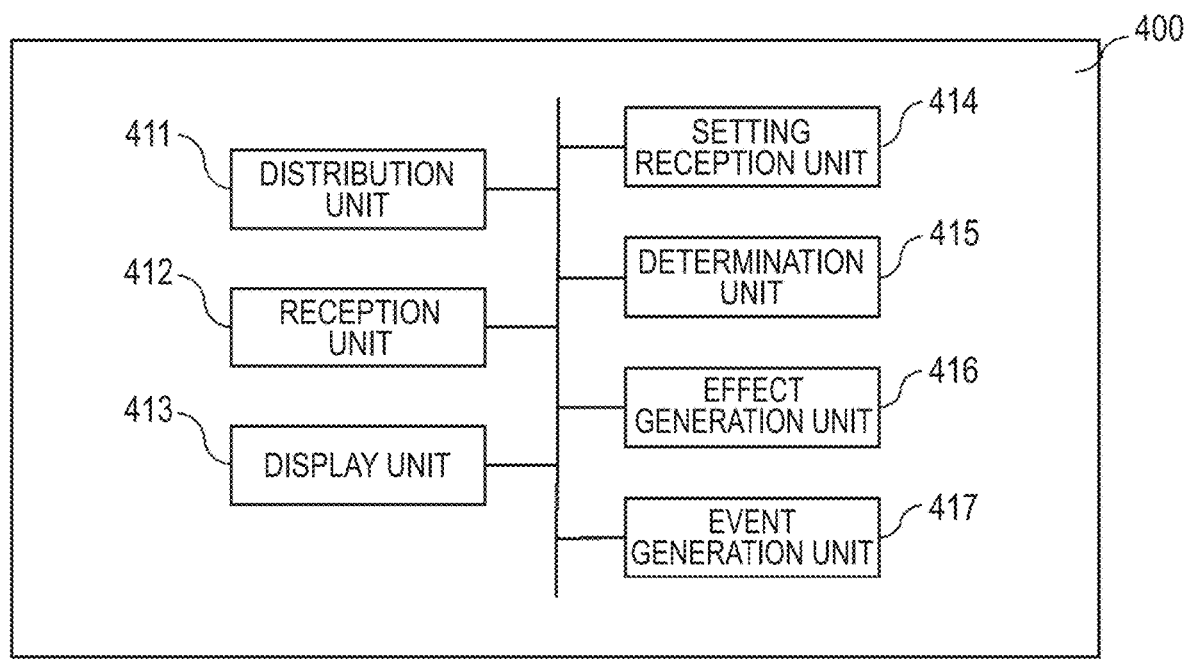
FIG. 22 is a configuration diagram illustrating another example of the function configuration of the server apparatus in the first embodiment in the disclosure.

As illustrated in FIG. 22, one or a plurality of computer processors in the disclosure may further include a setting reception unit 414.

The setting reception unit 414 may be for setting the specific gift.

The setting reception unit 414 may be capable of setting one or a plurality of gifts selected from the gift list screen by the distribution user as the specific gift.

As described above, the distribution user may be capable of selecting one or a plurality of gifts from the gift list screen (FIG. 21) that is laid out by selecting the gift setting column D29 in the item of the wish list displayed on the distribution setting screen D20 illustrated in FIG. 20, and the setting reception unit 414 may be capable of receiving such selection.

Subsequently, an example of a flow when the viewing user performs the display request for the specific gift may be described.

The reception unit 412 may be capable of receiving the display request for the predetermined gift from the viewing user terminal 200 through the gift list screen.

As described above, the gift list screen can be the gift list screen V30 (FIG. 13) that is laid out by pressing the gift button V13, on the viewing screen V10 as illustrated in FIG. 12.

In this case, as illustrated in FIG. 22, one or a plurality of computer processors in the disclosure may further include a determination unit 415.

The determination unit 415 may determine whether the predetermined gift according to the display request received by the reception unit 412 is the specific gift.

Specifically, it may be determined whether the gift object identification information of the predetermined gift is coincident with the gift object identification information of the specific gift.

Then, in a case where the determination unit 415 determines that the predetermined gift is the specific gift, the display unit 413 may display the specific gift object in the moving image.

According to the configuration described above, even in a case where the viewing user performs the display request for the gift from the gift list screen V30, the specific gift object can be displayed as if the display request for the gift is performed from the specific display V27.

In addition, the display unit 413 may be capable of displaying the gift list screen on which the specific gift corresponding to the specific display V27 is displayed to be identifiable from other gifts on the viewing user terminal 200, in accordance with the selection of the specific display V27 by the viewing user.

Figure 23:
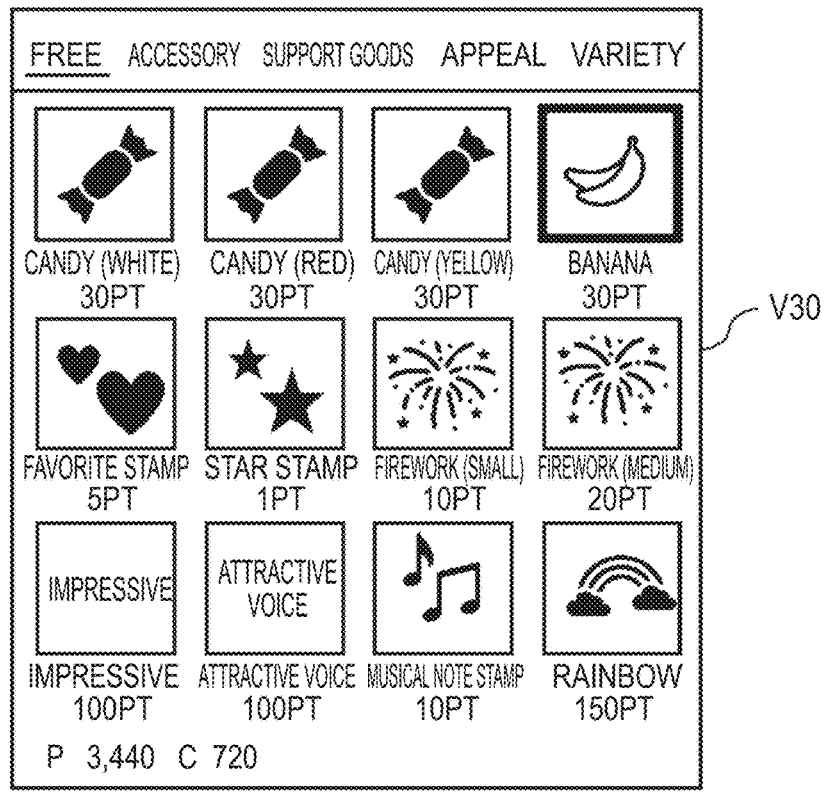
FIG. 23 is a conceptual diagram illustrating an exemplary image of the screen that is displayed on the user terminal.

Specifically, the gift list screen V30 may be laid out in accordance with the selection of the specific display V27. As illustrated in FIG. 23, on the gift list screen V30, the specific gift corresponding to the specific display (the gift set as the specific gift) may be displayed to be identifiable from other gifts.

Note that, as illustrated in FIG. 23, displaying the gift to be identifiable from other gifts, for example, may indicate surrounding the gift by a frame larger than that of the other gifts or a frame different from that of the other gifts, displaying the gift at the center position of the gift list screen, displaying the gift to be larger than the other gifts, or displaying only the specific gift to be in motion (such as shaking). In addition, a tab in which only the specific gift set in the wish list is displayed may be generated to be discriminated from other gifts.

Then, the reception unit 412 may receive the display request for the specific gift from the viewing user terminal 200 through the gift list screen V30.

As described above, an example has been described in which the specific gift is subjected to the display request by selecting the specific gift from the gift list screen V30, but the reception unit 412 may be capable of receiving the display request for the specific gift from the viewing user terminal 200, in accordance with the selection of the specific display V27 by the viewing user.

In an example where the gift list screen is laid out from the selection of the specific display V27, it may be necessary for the viewing user to perform a selection manipulation at least twice until the transmission of the display request for the specific gift, and thus, it is possible to prevent an unintended gift from being subjected to the display request.

On the other hand, in an example where the display request is transmitted only by the selection of the specific display V27, it may not be necessary for the user to constantly perform the selection manipulation, and thus, advantageously, it may be easy to send the specific gift. In addition, it is also possible to save the effort of selecting a desired gift/a desired letter from an enormous number of displayed gifts or displayed letters, and reduce a communication amount for transmitting and receiving information for displaying the enormous number of gifts or letters and/or information relevant to the selected gift or the selected letter.

Regarding this, in a case where the specific gift set by the distribution user is the paid gift, the gift list screen may be laid out by the selection of the specific display, and in a case where the specific gift set by the distribution user is the free gift, the display request may be directly transmitted without using the gift list screen V30.

In addition, the setting reception unit 414 described above may be for setting the specific comment.

Specifically, the setting reception unit 414 may be capable of setting the text designated by the distribution user as the specific comment.

As described above, the predetermined text can be input to the comment setting column D28 in the item of the wish list displayed on the distribution setting screen D20 illustrated in FIG. 20, and the input can be received by the setting reception unit 414.

Subsequently, an example of a flow when the viewing user performs the display request for the specific comment may be described.

The display unit 413 may display the specific comment corresponding to the specific display in the comment input column V11, in accordance with the selection of the specific display V27 by the viewing user. Note that, in FIG. 19, the icon in a case where the banana gift is set as the specific display V27 is illustrated, and in this example, the icon can be an icon in which the specific comment is displayed, an icon indicating that the specific comment is set (for example, icon with a catchphrase such as "Password is THIS"), or the like.

Then, the reception unit 412 may be capable of receiving the display request for the specific comment from the viewing user terminal 200, in accordance with the selection of the transmission button V12 associated with the comment input column V11.

In addition, the reception unit 412 may be capable of receiving the display request for the predetermined comment from the viewing user terminal 200 through the comment input column V11.

Figure 24:
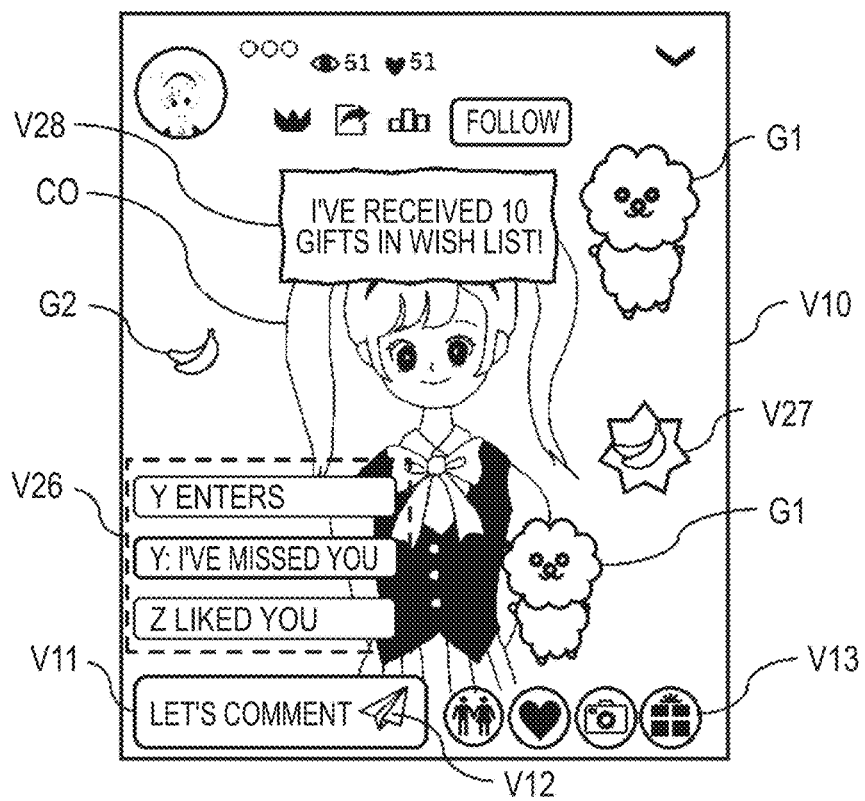
FIG. 24 is a conceptual diagram illustrating an exemplary image of the screen that is displayed on the user terminal.

As described above, the comment input column is the comment input column V11 on the viewing screen V10 as illustrated in FIG. 12 and FIG. 24. The viewing user may input the text to the comment input column V11, and may be capable of performing the display request for the comment by pressing the transmission button V12.

The determination unit 415 may be capable of determining whether the predetermined comment according to the display request received by the reception unit 412 is the specific comment.

Specifically, it may be determined whether the text information of the predetermined comment is coincident with the text information of the specific comment. Note that, here, only the case of a concordance rate of 100% may be determined as coincidence, or the case of a concordance rate of a predetermined value or more (for example, 90% or more) may be determined as coincidence.

In a case where the determination unit 415 determines that the predetermined comment is the specific comment, the display unit 413 may display the specific comment in the moving image.

According to the configuration described above, even in a case where the viewing user performs the display request for the comment from the comment input column, the specific comment can be displayed as if the display request for the comment is performed from the specific display.

As described above, an example has been described in which the specific comment is subjected to the display request by selecting the transmission button V12, but the reception unit 412 may be capable of receiving the display request from the specific comment from the viewing user terminal 200, in accordance with the selection of the specific display V27 by the viewing user.

In an example where the comment is input to the comment input column V11 from the selection of the specific display V27, it is not necessary for the viewing user to perform the selection manipulation at least twice until the transmission of the display request for the specific gift, and thus, it is possible to prevent an unintended gift from being subjected to the display request. On the other hand, in an example where the display request is transmitted only by the selection of the specific display V27, it may not be necessary for the user to constantly perform the selection manipulation, and thus, advantageously, it may be easy to post the specific comment.

The display unit 413 may be capable of displaying the specific display V27 only on a specific viewing user terminal 200.

The specific viewing user terminal 200 is determined on the basis of an action history of the moving image with respect to a moving image of the viewing user.

As an example, the action history can be a history relevant to a viewing time for the moving image by the viewing user and/or the number of display requests for the gift and/or the comment in the moving image by the viewing user.

Note that, the viewing time can be a viewing time for one moving image of one distribution user or the total viewing time for all moving images of one distribution user. Alternatively, the viewing time can be a viewing time for one moving image of any one distribution user or the total viewing time of all moving images of all distribution users.

As an example, in a case where the specific viewing user terminal 200 is determined on the basis of the history relevant to the viewing time, the specific viewing user terminal is a viewing user terminal of which the viewing time is a predetermined time or longer.

In this case, in the specific display V27 to be displayed, objects relevant to the paid gift may be preferentially displayed.

As an example, in a case where the specific viewing user terminal 200 is determined on the basis of the history relevant to the viewing time, the specific viewing user terminal may be the viewing user terminal 200 of which the viewing time is shorter than the predetermined time. Alternatively, as an example, in a case where the specific viewing user terminal is determined on the basis of the history relevant to the viewing time, the specific viewing user terminal may be the viewing user terminal of the viewing user viewing the moving image of one distribution user for the first time.

In this case, in the specific display V27 to be displayed, objects relevant to the free gift (the point gift) may be preferentially displayed.

The number of display requests can be the number of display requests for one moving image of one distribution user or the total number of display requests for all moving images of one distribution user. Alternatively, the number of display requests can be the number of display requests for one moving image of any one distribution user or the total number of display requests for all moving images of all distribution users.

As an example, in a case where the specific viewing user terminal 200 is determined on the basis of the history relevant to the number of display requests, the specific viewing user terminal may be a (VIP) viewing user terminal of which the number of display requests is a predetermined number or more.

In addition, in this case, in the specific display V27 to be displayed, the objects relevant to the paid gift may be preferentially displayed.

As an example, in a case where the specific viewing user terminal is determined on the basis of the history relevant to the number of display requests, the specific viewing user terminal may be a viewing user terminal of which the number of display requests is less than the predetermined number.

In addition, in this case, in the specific display V27 to be displayed, the objects relevant to the free gift may be preferentially displayed.

As described above, the information relevant to the moving image may include information for displaying the specific display V27, and such information may be uniformly transmitted to the viewing user terminal 200. In addition, in the viewing user terminal 200 that receives information for displaying the specific display, whether to display the specific display in the moving image may be determined on the basis of such information.

As illustrated in FIG. 22, one or a plurality of computer processors in the disclosure may further include an effect generation unit 416.

When the display unit 413 displays the specific gift object and/or the specific comment in the moving image, the effect generation unit 416 may generate a specific effect in association with the specific gift object and/or the specific comment.

Examples of generating the specific effect in association with the specific gift object include adding a display effect to the specific gift object. The display effect, for example, may be displaying an object of a firecracker, adding a twinkle effect to a layer on the gift, adding a sound effect when appearing, and the like, but is not limited to the examples described above.

Examples of generating the specific effect in association with the specific comment may include displaying the specific comment to be identifiable from other comments. Displaying the comment to be identifiable, for example, may indicate surrounding the comment by a frame larger than that of the other comments or a frame with a color different from that of the other comments, displaying the comment with a color or a size different from that of the other comments, and displaying the comment to be in motion (such as shaking), but is not limited to the examples described above. In addition, only the specific comment may be read.

In addition, examples of generating the specific effect in association with the specific gift object and/or the specific comment may include increasing a display time thereof compared to the case of normally displaying the gift (displaying the gift without designating the gift as the specific gift). In particular, in the case of the specific comment, the comment may be fixedly displayed (such as pinning) in the comment column only for a given length of time.

As illustrated in FIG. 22, one or a plurality of computer processors in the disclosure may further include an event generation unit 417.

In a case where the number of times for receiving the display request reaches a predetermined value, the event generation unit 417 may generate a predetermined event in the moving image.

In this case, the setting reception unit 414 may be capable of setting a value (the predetermined value described above) of the number of times for receiving the display request for generating the predetermined event.

The predetermined event may be capable of generating an effect or a screen for notifying that the number of times for receiving the display request reaches the predetermined value. In addition, the predetermined event may be capable of displaying a system comment indicating that the number of times for receiving the display request reaches the predetermined value in the comment column.

Examples of the effect may include scattering confetti in the moving image, and the like, and examples of the screen may include a notification screen V28 as illustrated in FIG. 24, and the like.

In accordance with such a notification, the distribution user may be capable of executing the event (singing a song, playing gatcha, and the like) by oneself.

Alternatively, the predetermined event may be capable of activating an effect for allowing the character object to perform a predetermined operation (expressing emotions). Examples of expressing the emotions may include an operation in which the character object pays attention to the notification screen V28, and the like.

Note that the distribution user may set the predetermined value described above on the distribution setting screen D20.

The setting reception unit 414 may be further capable of setting an upper limit value of the number of times for receiving the display request.

The distribution user may also be capable of setting such an upper limit value on the distribution setting screen D20. Alternatively, the upper limit value may be automatically set on the basis of the number of followers of the distribution user. In addition, the upper limit value based on the number of followers of the distribution user may be set as the initial value, but the upper limit value may be changed from the initial value by the manipulation of the distribution user.

Then, in a case where the number of times for receiving the display request reaches the upper limit value, the reception unit 412 may not receive the subsequent display request.

Accordingly, it is possible to prevent the screen or the comment column from being filled with the specific gift object and/or the specific comment. Note that the setting of the upper limit value may be applied only in a case where the specific comment and the free specific gift are set.

A ranking based on a point according to the number of display requests for the gift and/or the value of the gift that is subjected to the display request can be set in the viewing user.

Such a ranking may be referred to as a "support ranking".

Then, the display request for the specific gift can be set to have a point higher than that of the same gift that is not set as the specific gift.

Specifically, in a case where the banana gift is not set as the specific gift, and the viewing user performs the display request for the banana gift, the number can be counted as 1, but in a case where the banana gift is set as the specific gift, and the viewing user performs the display request for the banana gift, the number can be counted as 2.

In addition, in a case where the banana gift is not set as the specific gift, and the viewing user performs the display request for the banana gift, the point can be counted as 100, but in a case where the banana gift is set as the specific gift, and the viewing user performs the display request for the banana gift, the point can be counted as 150.

In addition, separately from the ranking described above, a ranking based on a point according to the number of display requests for the specific gift and the value of the specific gift that is subjected to the display request can be set in the viewing user.

A case where a character object of another user is included in the moving image, that is, an application example in the collaboration distribution may be described.

The display unit 413 may be capable of displaying the specific display V27 corresponding to the specific gift and/or the specific comment set in accordance with the manipulation of the distribution user and/or another user on the screen.

Specifically, one or both of the distribution user and another user who asks the distribution user for the collaboration and participates in the moving image may be capable of setting the specific gift and/or the specific comment.

In this case, the specific display V27 can be displayed by the number of users who set the specific gift and/or the specific comment. In this case, it is preferable that to which user a specific user corresponds is displayed to be identifiable.

Then, the display unit 413 may display the specific gift object and/or the specific comment in the moving image, in accordance with the selection of the specific display by the viewing user.

Second Embodiment

Subsequently, various functions executable in the distribution user terminal 100, the viewing user terminal 200, and/or the server apparatus 400, which are provided in the information processing system 3000 according to a second embodiment in the disclosure, may be described with reference to the drawings.

Figure 25:
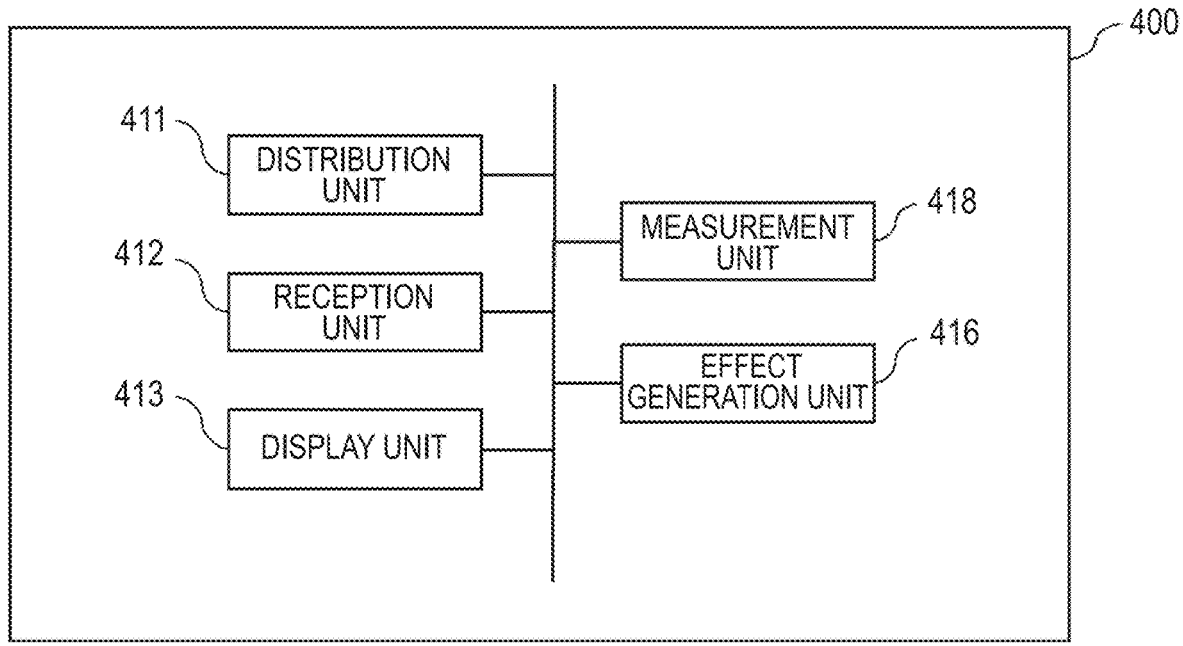
FIG. 25 is a configuration diagram illustrating another example of the function configuration of the server apparatus in the first embodiment in the disclosure.

As illustrated in FIG. 25, one or a plurality of computer processors provided in the information processing system 3000 according to the embodiments of the disclosure include the distribution unit 411, the reception unit 412, the display unit 413, a measurement unit 418, and an effect generation unit 416.

The distribution unit 411 may transmit the information relevant to the moving image including the character object of the distribution user to the viewing user terminal 200 to display the moving image on the viewing user terminal 200.

The details of such a distribution unit 411 may be as described above.

The reception unit 412 may receive the display request for the predetermined gift and/or the predetermined comment from the viewing user terminal 200.

The details of such a reception unit 412 may be as described above.

The display unit 413 may display the predetermined gift object corresponding to the predetermined gift and/or the predetermined comment in the moving image, in accordance with the display request received by the reception unit 412.

The details of such a display unit 413 may be as described above.

The measurement unit 418 may measure the number of display requests according to the specific gift and/or the specific comment set in accordance with the manipulation of the distribution user, in the predetermined gift and/or the predetermined comment according to the display request received by the reception unit 412.

Specifically, whether the predetermined gift and/or the predetermined comment according to the display request transmitted from the viewing user terminal 200 through the gift list screen V30 are the specific gift and/or the specific comment is determined. Such determination can be performed by the determination unit 415 described above.

Then, the measurement unit 418 may increase the number of display requests by one for each time when it is determined that the predetermined gift and/or the predetermined comment are the specific gift and/or the specific comment.

Then, the effect generation unit 416 may generate a predetermined effect in the moving image when the number of times measured by the measurement unit 418 reaches a specific number of times.

The predetermined effect generated by the effect generation unit 416 is as described above.

In addition, as another embodiment, as the specific display V27 or instead of the specific display V27, the system comment may be fixedly displayed in the comment column. Fixedly displaying is so-called comment pinning, and it is preferable that the comment is fixedly displayed at a position that the viewing user easily checks, such as on the top or on the bottom of the comment display column V26.

Note that the system comment in the disclosure can be displayed to be identifiable from other comments.

In specific examples described in the first embodiment and the second embodiment described above, an example has been described in which the specific gift and/or the specific comment are set one by one, but a plurality of specific gifts and/or specific comments may be set. In this case, a plurality of specific may display V27 may be displayed, or one specific display V27 may function as a button for laying out a list of the plurality of specific gifts and/or specific comments.

In addition, in a case where both of the specific gift and the specific comment are set, a plurality of specific may display V27 may be displayed, or one specific display V27 may function as a button for laying out a list of the specific gift and the specific comment.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, an example of an information processing method in the embodiments of the disclosure may be described.

The information processing method in the embodiments of the disclosure may be an information processing method in the information processing system 3000 illustrated in FIG. 3. The information processing system 3000 may include one or more distribution user terminals 100, the viewing user terminal 200, and the server apparatus 400.

Figure 26:
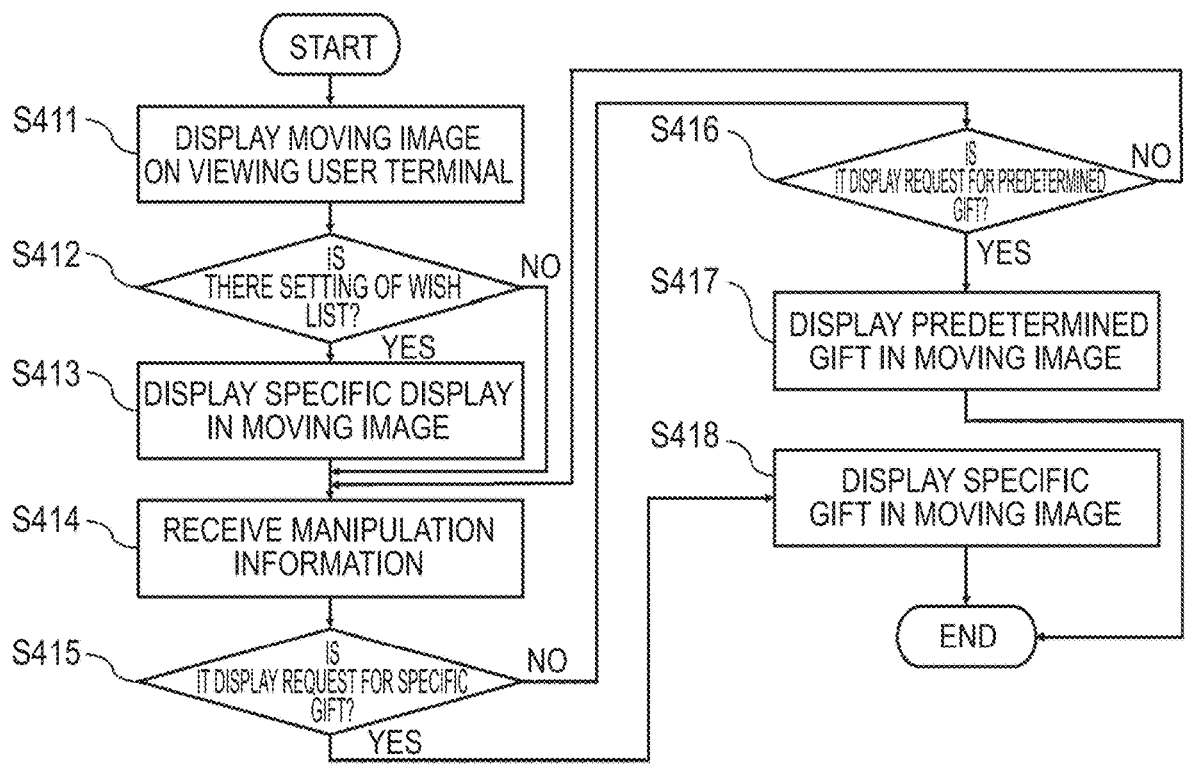
FIG. 26 is a flowchart illustrating an example of a flow of an information processing method in the disclosure.

As illustrated in FIG. 26 as an example, the information processing method in the disclosure may allow one or a plurality of computer processors provided in the information processing system 3000 to execute a distribution step S411, a reception step S414, and display steps S417 and 418.

In the distribution step S411, the information relevant to the moving image including the character object of the distribution user may be transmitted to the viewing user terminal 200, and thus, the moving image may be displayed on the viewing user terminal 200. Such a distribution step S411 can be executed by the distribution unit 411 described above.

The distribution step S411 may be executed on a server side (the server apparatus 400), or may be executed on a client side (the distribution user terminal 100).

In the reception step S414, the display request for the predetermined gift and/or the predetermined comment from the viewing user terminal 200 is received. Specifically, in the reception step S414, the manipulation information from the viewing user terminal 200 is received, whether the received manipulation information is the display request for the specific gift and/or the specific comment is determined (S415), and in a case where the received manipulation information is not the display request for the specific gift and/or the specific comment, whether the received manipulation information is the display request for the predetermined gift and/or the predetermined comment is further determined (S416). Such a reception step S412 can be executed by the reception unit 412 described above.

The reception step S414 may be executed on the server side (the server apparatus 400), or may be executed on the client side (the distribution user terminal 100).

In the display step S417, the predetermined gift object and/or the predetermined comment corresponding to the predetermined gift and/or the predetermined comment may be displayed in the moving image, in accordance with the display request received in the reception step S414. Specifically, in the display step S417, in a case where the received manipulation information is the display request for the predetermined gift and/or the predetermined comment, the predetermined gift object and/or the predetermined comment corresponding to the predetermined gift and/or the predetermined comment are displayed in the moving image. Such a display step S417 can be executed by the display unit 413 described above.

The display step S417 may be executed on the server side (the server apparatus 400), or may be executed on the client side (the distribution user terminal 100).

Then, in the display step S418, the specific display V27 corresponding to the specific gift and/or the specific comment set in accordance with the manipulation of the distribution user may be displayed in the moving image, and the specific gift object and/or the specific comment may be displayed in the moving image, in accordance with the selection of the specific display V27 by the viewing user. Specifically, in the display step S418, in a case where the received manipulation information is the display request for the specific gift and/or the specific comment, the specific gift object and/or the specific comment corresponding to the specific gift and/or the specific comment may be displayed in the moving image. Such a display step S418 can be executed by the display unit 413 described above.

The display step S418 may be executed on the server side (the server apparatus 400), or may be executed on the client side (the distribution user terminal 100).

In addition, as illustrated in FIG. 26 as an example, the information processing method in the disclosure may be capable of allowing one or a plurality of computer processors provided in the information processing system 3000 to further execute a step S412 of determining whether the specific gift and/or the specific comment are set (the wish list is set), and a step S413 of displaying the specific display V27.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, a computer program in the embodiments of the disclosure may be described.

As illustrated in FIG. 3, the computer program in the embodiments of the disclosure is a computer program to be executed in the information processing system 3000 that may distribute the moving image. The information processing system 3000 may include one or more distribution user terminals 100, the viewing user terminal 200, and the server apparatus 400.

The computer program in the disclosure may allow one or a plurality of computer processors provided in the information processing system 3000 to attain a distribution function, a reception function, and a display function.

The distribution function may transmit the information relevant to the moving image including the character object of the distribution user to the viewing user terminal 200 to display the moving image on the viewing user terminal 200.

The reception function may receive the display request for the predetermined gift and/or the predetermined comment from the viewing user terminal 200.

The display function may display the predetermined gift object and/or the predetermined comment corresponding to the predetermined gift and/or the predetermined comment in the moving image, in accordance with the display request received by the reception function.

Then, the display function may display the specific display V27 corresponding to the specific gift and/or the specific comment set in accordance with the manipulation of the distribution user in the moving image, and may display the specific gift object and/or the specific comment in the moving image, in accordance with the selection of the specific display V27 by the viewing user.

Figure 27:
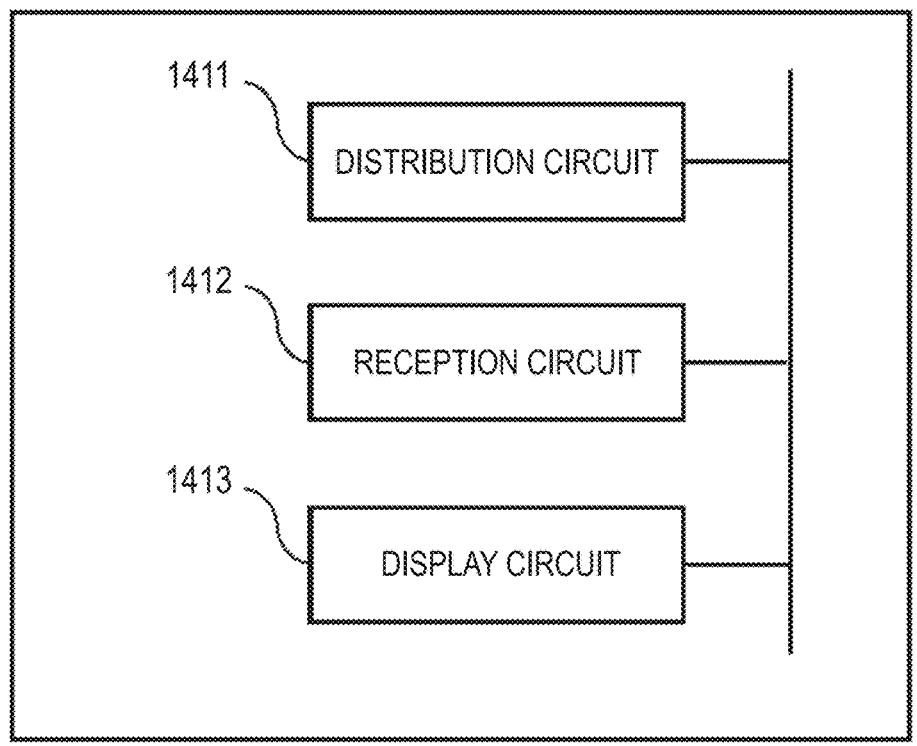
FIG. 27 is a circuit configuration diagram illustrating an example of a circuit configuration for attaining a computer program in the disclosure.

The functions described above can be attained by a distribution circuit 1411, a reception circuit 1412, and a display circuit 1413 illustrated in FIG. 27. The distribution circuit 1411, the reception circuit 1412, and the display circuit 1413 may be attained by the distribution unit 411, the reception unit 412, and the display unit 413 described above, respectively. The details of each unit are as described above.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, an information processing apparatus in the embodiments of the disclosure may be described. The information processing apparatus may correspond to the distribution user terminal 100 in the information processing system 3000 described above.

Figure 28:
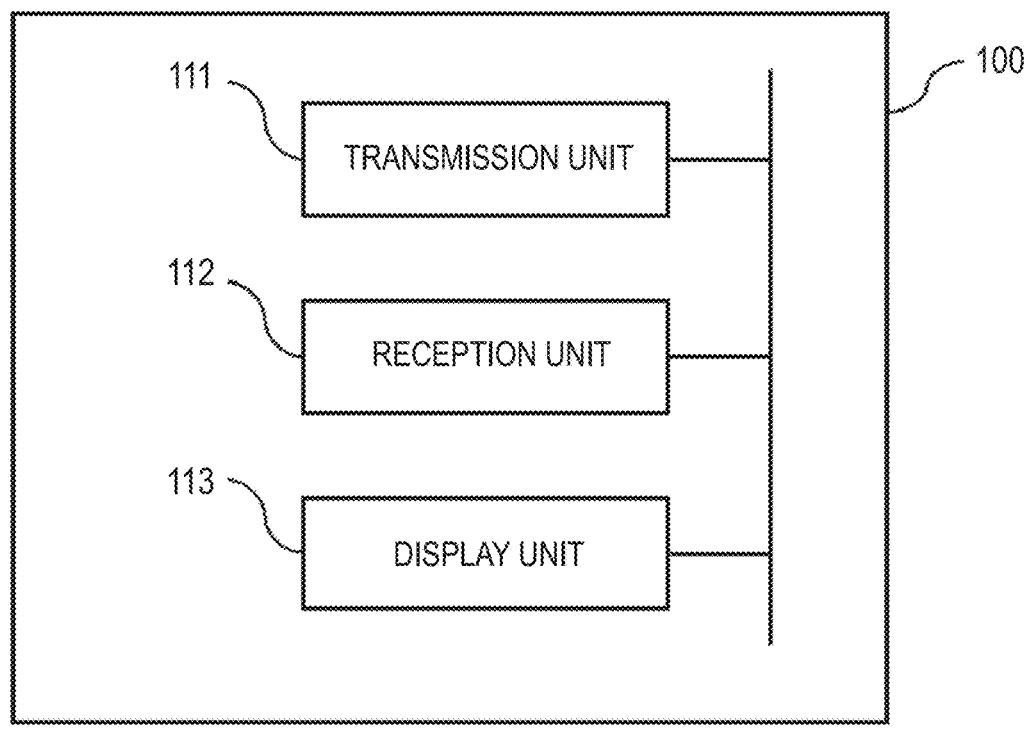
FIG. 28 is a configuration diagram illustrating an example of a function configuration of the distribution user terminal in the disclosure.

As illustrated in FIG. 28, the information processing apparatus may include a transmission unit 111, a reception unit 112, and a display unit 113.

The transmission unit 111 may transmit the information relevant to the moving image including the character object of the distribution user and information relevant to the manipulation of the distribution user relevant to the setting of the specific gift and/or the specific comment to the server apparatus 400. The details of the setting of the specific gift and/or the specific comment may be as described above.

The reception unit 112 may receive the display request for the specific gift and/or the specific comment from the server apparatus 400, in accordance with the selection of the specific display V27 corresponding to the specific gift and/or the specific comment set in accordance with the manipulation of the distribution user by the viewing user terminal 200. The details of the specific display V27 may be as described above.

The display unit 113 may display the specific gift object and/or the specific comment in the moving image, on the basis of the display request received by the reception unit 112.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, an example of an information processing method in the embodiments of the disclosure may be described. Such an information processing method may be an information processing method that is executed in the information processing apparatus described above (the distribution user terminal 100).

Figure 29:
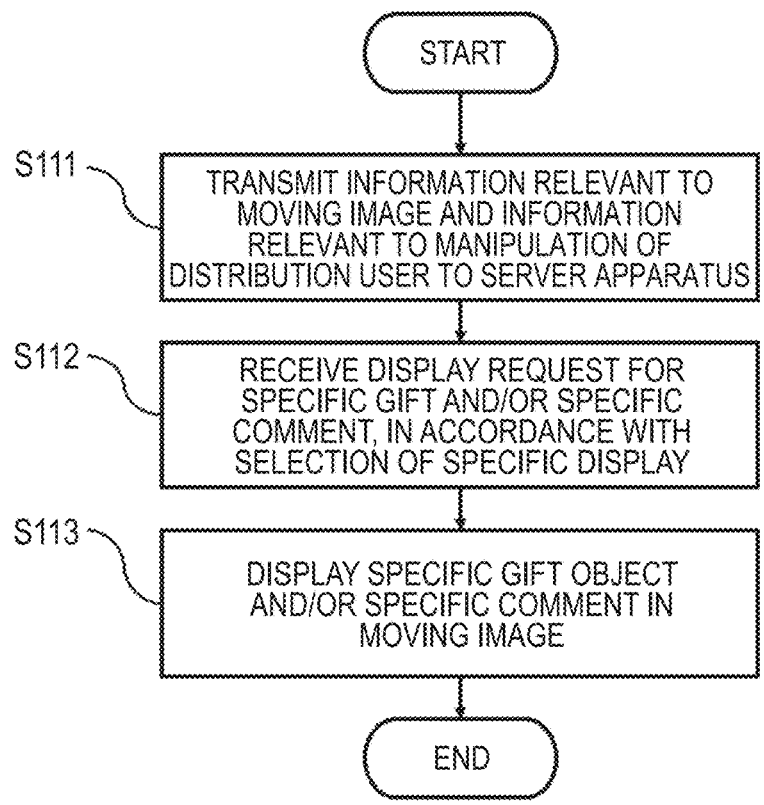
FIG. 29 is a flowchart illustrating an example of a flow of an information processing method in the distribution user terminal in the disclosure.

As illustrated in FIG. 29 as an example, the information processing method in the disclosure may allow one or a plurality of computer processors provided in the information processing apparatus to execute a transmission step S111, a reception step S112, and a display step S113.

In the transmission step S111, the information relevant to the moving image including the character object of the distribution user and the information relevant to the manipulation of the distribution user relevant to the setting of the specific gift and/or the specific comment may be transmitted to the server apparatus. Such a transmission step S111 can be executed by the transmission unit 111 described above.

In the reception step S112, the display request for the specific gift and/or the specific comment may be received from the server apparatus 400, in accordance with the selection of the specific display V27 corresponding to the specific gift and/or the specific comment set in accordance with the manipulation of the distribution user by the viewing user terminal 200. Such a reception step S112 can be executed by the reception unit 112 described above.

In the display step S113, the specific gift object and/or the specific comment may be displayed in the moving image, on the basis of the display request received in the reception step. Such a display step S113 can be executed by the display unit 113 described above.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, a computer program in the embodiments of the disclosure may be described. Such a computer program may be a computer program that is executed in the information processing apparatus described above (the distribution user terminal 100).

The computer program in the disclosure may allow one or a plurality of processors provided in the information processing apparatus to attain a transmission function, a reception function, and a display function.

The transmission function may transmit the information relevant to the moving image including the character object of the distribution user and the information relevant to the manipulation of the distribution user relevant to the setting of the specific gift and/or the specific comment to the server apparatus 400.

The reception function may receive the display request for the specific gift and/or the specific comment from the server apparatus 400, in accordance with the selection of the specific display corresponding to the specific gift and/or the specific comment set in accordance with the manipulation of the distribution user by the viewing user terminal.

The display function may display the specific gift object and/or the specific comment in the moving image, on the basis of the display request received by the reception function.

Figure 30:
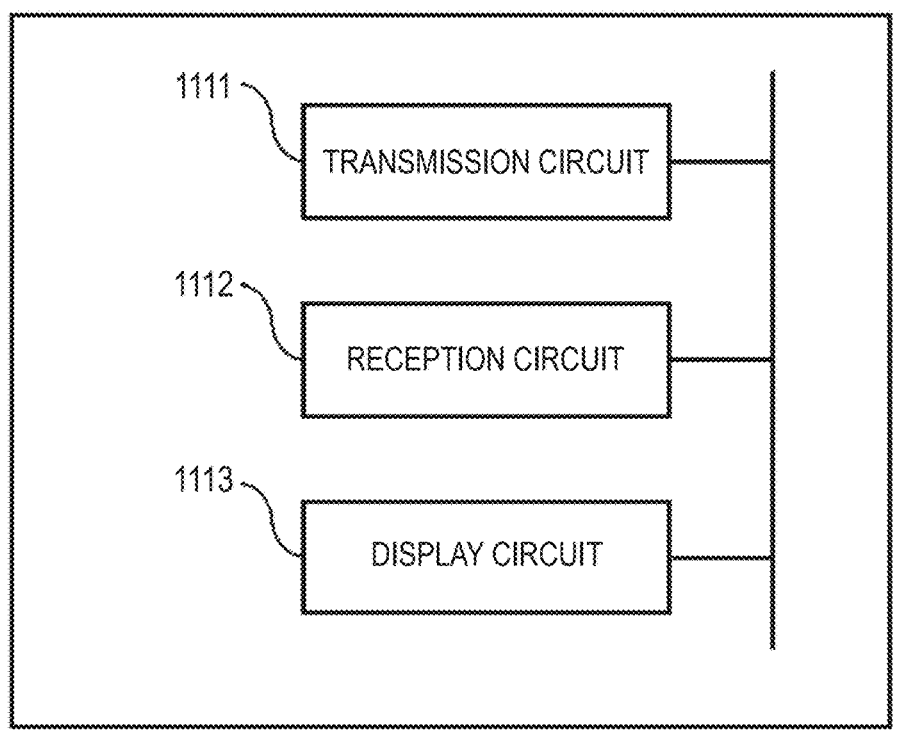
FIG. 30 is a circuit configuration diagram illustrating an example of a circuit configuration for attaining a computer program that is executed by the distribution user terminal in the disclosure.

The functions can be attained by a transmission circuit 1111, a reception circuit 1112, and a display circuit 1113 illustrated in FIG. 30. The transmission circuit 1111, the reception circuit 1112, and the display circuit 1113 may be attained by the transmission unit 111, the reception unit 112, and the display unit 113 described above, respectively. The details of each unit are as described above.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, an information processing apparatus in the embodiments of the disclosure may be described. The information processing apparatus corresponds to the viewing user terminal 200 in the information processing system 3000 described above.

Figure 31:
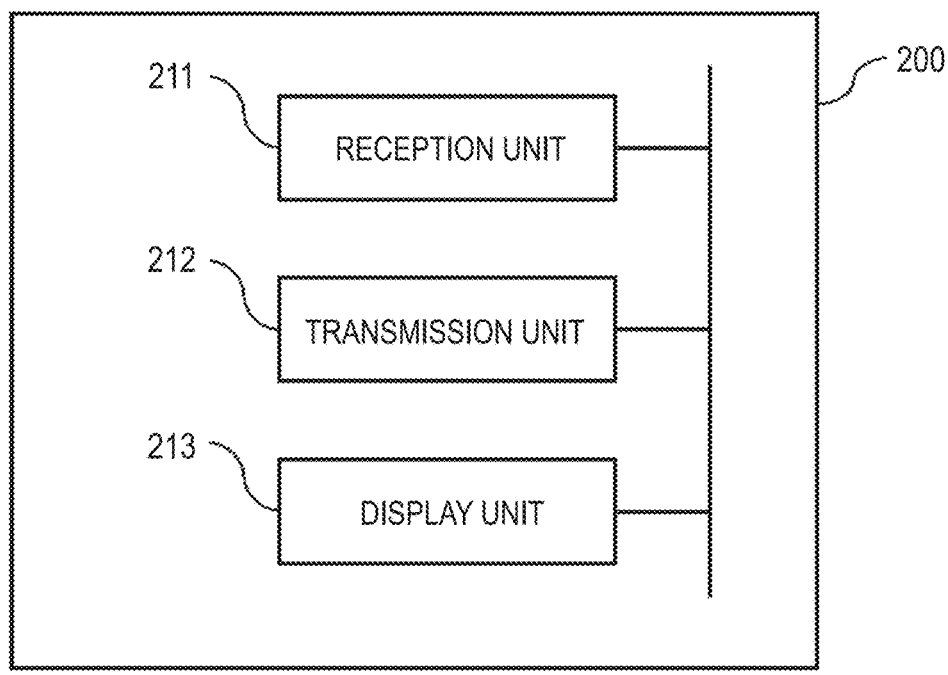
FIG. 31 is a configuration diagram illustrating an example of a function configuration of the viewing user terminal in the disclosure.

As illustrated in FIG. 31, the information processing apparatus may include a reception unit 211, a transmission unit 212, and a display unit 213.

The reception unit 211 may receive the information relevant to the moving image including the character object of the distribution user and the information relevant to the manipulation of the distribution user relevant to the setting of the specific gift and/or the specific comment from the server apparatus. The details of the setting of the specific gift and/or the specific comment may be as described above.

The transmission unit 212 may transmit the display request for the specific gift and/or the specific comment to the server apparatus by selecting the specific display V27 corresponding to the specific gift and/or the specific comment set in accordance with the manipulation of the distribution user. The details of the specific display V27 may be as described above.

The display unit 213 may display the specific gift object and/or the specific comment in the moving image, on the basis of the display request.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or the interaction motivation between the users.

Subsequently, an example of an information processing method in the embodiments of the disclosure may be described. Such an information processing method is an information processing method that is executed in the information processing apparatus described above (the viewing user terminal 200).

Figure 32:
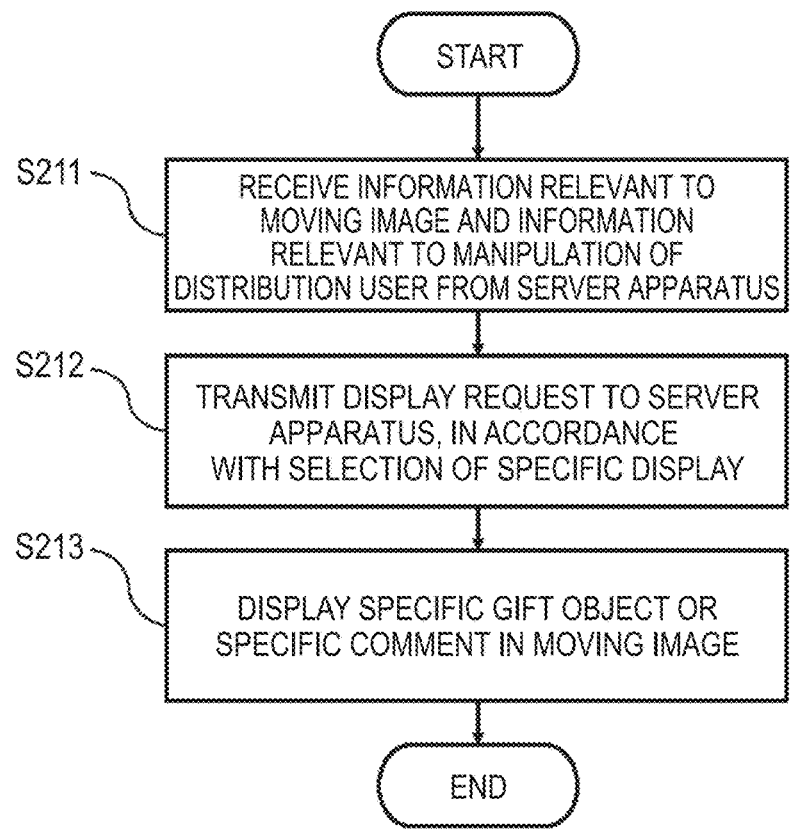
FIG. 32 is a flowchart illustrating an example of a flow of an information processing method in the viewing user terminal in the disclosure.

As illustrated in FIG. 32 as an example, the information processing method in the disclosure may allow one or a plurality of computer processors provided in the information processing apparatus to execute a reception step S211, a transmission step S212, and a display step S213.

In the reception step S211, the information relevant to the moving image including the character object of the distribution user and the information relevant to the manipulation of the distribution user relevant to the setting of the specific gift and/or the specific comment may be received from the server apparatus 400. Such a reception step S211 can be executed by the reception unit 211 described above.

In the transmission step S212, the display request for the specific gift and/or the specific comment may be transmitted to the server apparatus 400 by selecting the specific display V27 corresponding to the specific gift and/or the specific comment set in accordance with the manipulation of the distribution user. Such a transmission step S212 can be executed by the transmission unit 212 described above.

In the display step S213, the specific gift object and/or the specific comment are displayed in the moving image, on the basis of the display request. Such a display step S213 can be executed by the display unit 213 described above.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or and the interaction motivation between the users.

Finally, a computer program in the embodiments of the disclosure may be described. Such a computer program may be a computer program that is executed in the information processing apparatus described above (the viewing user terminal 200).

The computer program in the disclosure may allow one or a plurality of processors provided in the information processing apparatus to attain a reception function, a transmission function, and a display function.

The reception function may receive the information relevant to the moving image including the character object of the distribution user and the information relevant to the manipulation of the distribution user relevant to the setting of the specific gift and/or the specific comment from the server apparatus 400.

The transmission function may transmit the display request for the specific gift and/or the specific comment to the server apparatus by selecting the specific display V27 corresponding to the specific gift and/or the specific comment set in accordance with the manipulation of the distribution user.

The display function may display the specific gift object and/or the specific comment in the moving image, on the basis of the display request.

Figure 33:
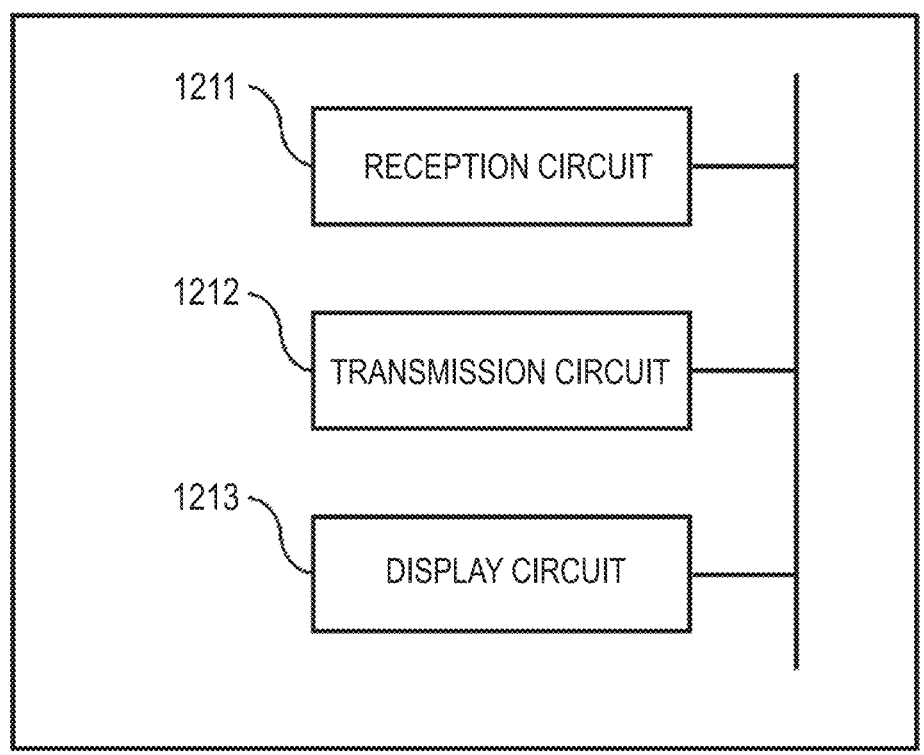
FIG. 33 is a circuit configuration diagram illustrating an example of a circuit configuration for attaining a computer program that is executed by the viewing user terminal in the disclosure.

The may function described above can be attained by a reception circuit 1211, a transmission circuit 1212, and a display circuit 1213 illustrated in FIG. 33. The reception circuit 1211, the transmission circuit 1212, and the display circuit 1213 may be attained by the reception unit 211, the transmission unit 212, and the display unit 213 described above, respectively. The details of each unit are as described above.

According to the configuration described above, it is possible to provide the technical improvement for solving or lessening at least a part of the problems of the related art described above. Specifically, according to the disclosure, it is possible to better facilitate user interaction and avoid frustrating the distribution motivation of the distribution user, the viewing motivation of the viewing user, and/or and the interaction motivation between the users.

In addition, an information processing apparatus such as a computer or a mobile phone can be preferably used to function as the server apparatus or the terminal apparatus according to the embodiments described above. Such an information processing apparatus can be attained by storing a program describing processing contents for attaining each function of the server apparatus or the terminal apparatus according to the embodiments in a storage unit of the information processing apparatus, and reading and executing the program with a CPU of the information processing apparatus.

Several exemplary embodiments have been described, but such embodiments are presented as an example and are not intended to limit the scope of the invention. Such novel embodiments can be implemented in various other modes, and various omissions, replacements, and modifications can be made within a range not departing from the gist of the invention. Such embodiments or the modifications thereof are included in the scope or the gist of the invention, and are included in the invention described in the claims and the scope equivalent thereto.

In addition, the method described in the embodiments, for example, can be stored in a recording medium such as a magnetic disk (a FLOPPY disk, a hard disk, and the like), and optical disk (such as a CD-ROM, a DVD, and a MO), and a semiconductor memory (such as a ROM, a RAM, and a flash memory), as a program that can be executed by a computer, and can also be transmitted and distributed by a communication medium. Note that, the program stored on the medium side also may include a setting program for configuring software means (including not only an execution program but also a table or a data structure) executed by the computer. The computer for attaining this device reads the program stored in the recording medium, and in some cases, constructs software means by the setting program, and controls the operation with the software means, thereby executing the processing described above. Note that, herein, the recording medium is not limited to a medium for distribution, and may include a storage medium such as a magnetic disk or a semiconductor memory that is provided in the computer or a device that is connected through a network. The storage unit, for example, may function as a main storage device, an auxiliary storage device, or a flash memory.

REFERENCE SIGNS LIST

100 distribution user terminal
200 viewing user terminal
300 network
400 server apparatus
411 distribution unit
412 reception unit
413 display unit

The invention claimed is:

1. An information processing system comprising a memory and processing circuitry comprising one or a plurality of computer processors,
wherein the processing circuitry is configured to:
transmit information relevant to a moving image including a character object of a distribution user to a viewing user terminal to display the moving image on the viewing user terminal;
receive a display request for at least one of a predetermined gift and a predetermined comment from the viewing user terminal;
display a predetermined gift object corresponding to the at least one of the predetermined gift and the predetermined comment in the moving image, in accordance with the display request received for the at least one of the predetermined gift or the predetermined comment, and
display a specific display corresponding to at least one of a specific gift and a specific comment set in accordance with a manipulation of the distribution user in the moving image, and display the at least one of the specific gift object and the specific comment in the moving image, in accordance with selection of the specific display by a viewing user.

2. The information processing system according to claim 1,
wherein the processing circuitry is further configured to:
set the specific gift, and
set one or a plurality of gifts selected from a gift list screen by the distribution user as the specific gift.

3. The information processing system according to claim 2, wherein the processing circuitry is further configured to:
set a value of a number of instances of received display requests, and trigger generation of a predetermined event upon receipt of at least the number of instances of received display requests, and
generate the predetermined event in the moving image when the number of instances of received display requests reaches the value.

4. The information processing system according to claim 2, wherein the processing circuitry is further configured to:
set an upper limit value of a number of instances of received display requests, and
cease receiving subsequent display requests when the number of instances of received display requests reaches the upper limit value.

5. The information processing system according to claim 1, wherein the processing circuitry is further configured to:
receive the display request for the predetermined gift from the viewing user terminal through a gift list screen,
determine whether the predetermined gift according to the display request received through the gift list screen is the specific gift, and
trigger display of the specific gift object in the moving image upon determination, by the processing circuitry, that the predetermined gift is the specific gift.

6. The information processing system according to claim 1, wherein the processing circuitry is further configured to:
display a gift list screen on which the specific gift corresponding to the specific display is displayed to be identifiable from other gifts on the viewing user terminal, in accordance with the selection of the specific display by the viewing user, and
receive the display request for the specific gift from the viewing user terminal through the gift list screen.

7. The information processing system according to claim 1, wherein the processing circuitry is further configured to:
receive the display request for the specific gift from the viewing user terminal, in accordance with the selection of the specific display by the viewing user.

8. The information processing system according to claim 1,
wherein the processing circuitry is further configured to:
set the specific comment, and
set a text designated by the distribution user as the specific comment.

9. The information processing system according to claim 8, wherein the processing circuitry is further configured to:
display the specific comment corresponding to the specific display in a comment input column, in accordance with the selection of the specific display by the viewing user, and
receive the display request for the specific comment from the viewing user terminal, in accordance with selection of a transmission button associated with the comment input column.

10. The information processing system according to claim 8, wherein the processing circuitry is further configured to:
receive the display request for the predetermined comment from the viewing user terminal through a comment input column,
determine whether the predetermined comment according to the display request received through the comment input column is the specific comment, and
display the specific comment in the moving image upon determination, by the processing circuitry, that the predetermined comment is the specific comment.

11. The information processing system according to claim 1, wherein the processing circuitry is further configured to:
display the specific display only on a specific viewing user terminal, and
determine the specific viewing user terminal based on an action history of the moving image with respect to a moving image of the viewing user.

12. The information processing system according to claim 11,
wherein the action history is a history relevant to at least one of: a viewing time for the moving image by the viewing user, a number of display requests for the gift, and the specific comment in the moving image by the viewing user.

13. The information processing system according to claim 1, wherein the processing circuitry is further configured to:
generate a specific effect in association with at least one of the specific gift object and the specific comment, wherein the processing circuitry is triggered to generate the specific effect upon display, by the processing circuitry, of the at least one of the specific gift object and the specific comment in the moving image.

14. The information processing system according to claim 1, wherein a plurality of viewing users are provided, said plurality of viewing users including the viewing user, and wherein the processing circuitry is further configured to:
establish a ranking of the plurality of viewing users, wherein said ranking is based on points accrued by each viewing user in the plurality of viewing users, said points accrued based on at least one of a number of display requests for the gift and a value of the gift that is subjected to the display request is set by each viewing user, and wherein the display request for the specific gift is set to have a point value higher than a point value of an identical gift that is not set as the specific gift.

15. The information processing system according to claim 1, wherein the processing circuitry is further configured to:
upon inclusion of a character object of another user in the moving image, display the specific display corresponding to the at least one of the specific gift and the specific comment set in accordance with the manipulation of at least one of the distribution user and the another user on a screen, and display the at least one of the specific gift object and the specific comment in the moving image, in accordance with the selection of the specific display by the viewing user.

16. An information processing method for allowing one or a plurality of computer processors to execute:
a distribution step of transmitting information relevant to a moving image including a character object of a distribution user to a viewing user terminal to display the moving image on the viewing user terminal;
a reception step of receiving a display request for at least one of a predetermined gift and a predetermined comment from the viewing user terminal; and
a display step of displaying a predetermined gift object corresponding to the at least one of the predetermined gift and the predetermined comment in the moving image, in accordance with the display request received in the reception step,
wherein in the display step, specific display corresponding to at least one of a specific gift and a specific comment set in accordance with a manipulation of the distribution user is displayed in the moving image, and the at least one of the specific gift object and the specific comment is displayed in the moving image, in accordance with selection of the specific display by a viewing user.

17. A non-transitory computer-readable medium comprising computer program code that, when executed, is configured to cause one or a plurality of computer processors to perform:
a transmission function of transmitting information relevant to a moving image including a character object of a distribution user and information relevant to a manipulation of the distribution user relevant to setting of at least one of a specific gift and a specific comment to a server apparatus;
a reception function of receiving a display request for the at least one of the specific gift and the specific comment from the server apparatus, in accordance with selection of specific display corresponding to the at least one of the specific gift and the specific comment set in accordance with the manipulation of the distribution user, by a viewing user terminal; and
a display function of displaying the at least one of the specific gift object and the specific comment in the moving image, on the basis of the display request received by the reception function.

* * * * *